(12) United States Patent
Saito

(10) Patent No.: US 11,494,534 B2
(45) Date of Patent: Nov. 8, 2022

(54) LAYERED-COMPOSITE-MEMBER SHAPE OPTIMIZATION ANALYSIS METHOD AND OPTIMIZATION ANALYSIS DEVICE

(71) Applicant: JFE Steel Corporation, Tokyo (JP)

(72) Inventor: Takanobu Saito, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 342 days.

(21) Appl. No.: 16/753,562

(22) PCT Filed: Jul. 30, 2018

(86) PCT No.: PCT/JP2018/028379
§ 371 (c)(1),
(2) Date: Apr. 3, 2020

(87) PCT Pub. No.: WO2019/077834
PCT Pub. Date: Apr. 25, 2019

(65) Prior Publication Data
US 2020/0302095 A1    Sep. 24, 2020

(30) Foreign Application Priority Data

Oct. 17, 2017 (JP) .............................. JP2017-200795

(51) Int. Cl.
| | |
|---|---|
| *G06F 30/20* | (2020.01) |
| *G06F 30/15* | (2020.01) |
| *G06F 30/17* | (2020.01) |
| *G06F 111/06* | (2020.01) |

(52) U.S. Cl.
CPC .............. *G06F 30/20* (2020.01); *G06F 30/15* (2020.01); *G06F 30/17* (2020.01); *G06F 2111/06* (2020.01)

(58) Field of Classification Search
CPC .......... G06F 30/00; G06F 30/20; G06F 30/15; G06F 30/17; G06F 2111/06
(Continued)

(56) References Cited

U.S. PATENT DOCUMENTS

| | | | |
|---|---|---|---|
| 2010/0262406 A1 | 10/2010 | Goel et al. | |
| 2016/0004793 A1* | 1/2016 | Saito ................. | G06F 30/00 703/1 |
| 2019/0050521 A1 | 2/2019 | Kamo et al. | |

FOREIGN PATENT DOCUMENTS

| | | |
|---|---|---|
| EP | 2953040 A1 | 12/2015 |
| JP | 2010250818 A | 11/2010 |

(Continued)

OTHER PUBLICATIONS

Allaire, G. et al., "Stacking Sequence and Shape Optimization of Laminated Composite Plates via a Level-Set Method", Jun. 29, 2016, Journal of the Mechanics and Physics of Solids 97, Elsevier Ltd. (Year: 2016).*

(Continued)

*Primary Examiner* — Cedric Johnson
(74) *Attorney, Agent, or Firm* — RatnerPrestia

(57) ABSTRACT

A layered-composite-member shape optimization analysis method includes: setting, as a design space, an optimization target part of a structural body model of an automotive body; generating a layered block model in the set design space, the layered block model including layers, each layer being a three-dimensional element and having material properties different from each other; connecting the generated layered block model to the part of the structural body model of the automotive body; and inputting an analysis condition, performing optimization analysis on the layered block model as an optimization analysis target, and determining an optimum shape of the layered block model.

14 Claims, 29 Drawing Sheets

(58) Field of Classification Search
USPC .............................................................. 703/1
See application file for complete search history.

(56) References Cited

FOREIGN PATENT DOCUMENTS

| JP | 2013025533 A | 2/2013 |
| JP | 2014149732 A | 8/2014 |
| JP | 2017058907 A | 3/2017 |
| JP | 2017146673 A | 8/2017 |

OTHER PUBLICATIONS

Allaire et al., "Stacking Sequence and Shape Optimization of Lamnated Composite Plates Via a Level-Set Method", Journal of Mechanics and Physics of Solids, 2015, 33 pages.
Extended European Search Report for European Application No. 18868721.4, dated Nov. 12, 2020, 9 pages.
Korean Office Action for Korean Application No. 10-2020-7010530, dated Oct. 21, 2021, with Concise Statement of Relevance of Office Action, 5 pages.
Yuge et al., "Optimal Design of a Construction Machine", Technical Reports of Seikei University, Faculty of Engineering, vol. 41, No. 1, 2004, pp. 1-5.
International Search Report and Written Opinion for International Application No. PCT/JP2018/028379, dated Oct. 23, 2018, 4 pages.
Yuge et al., "Optimum Design of a Construction Machine", Technical Reports of Seikei University, Faculty of Engineering, vol. 41, No. 1, 2004, pp. 1-5.

\* cited by examiner

FIG.10
Case 1
OUTER LAYER: STEEL
INNER LAYER: STEEL
(a)
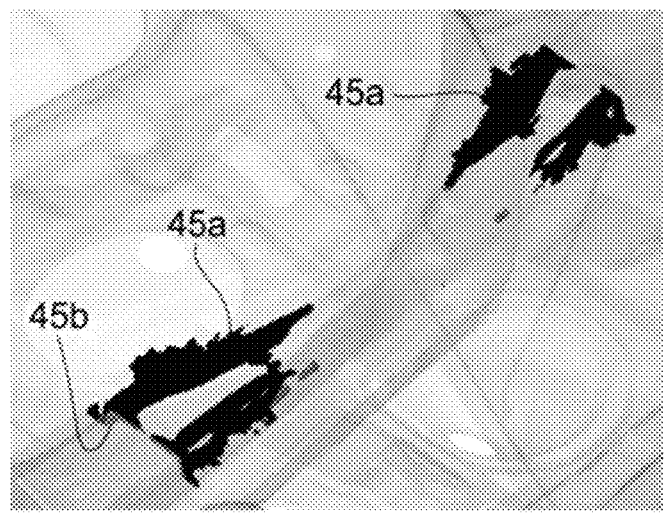
(b)
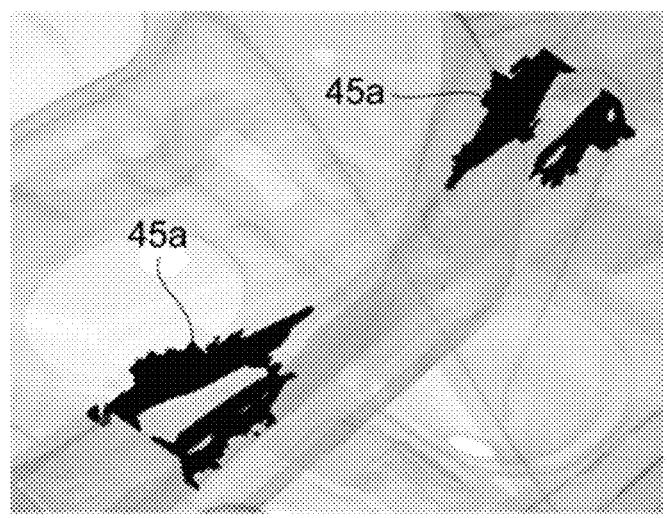
(c)
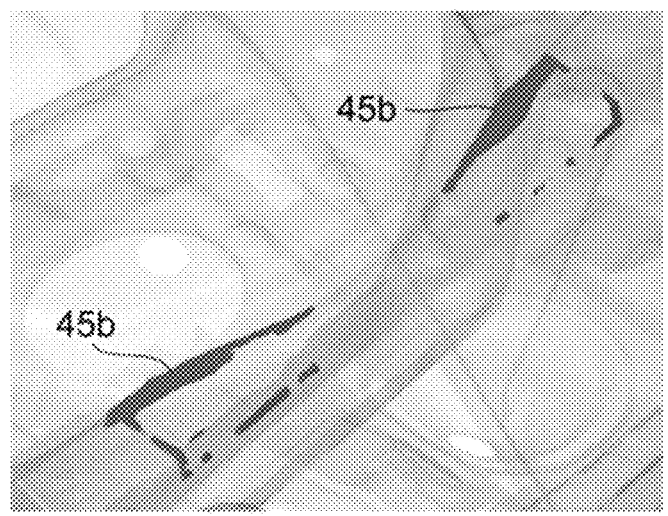

FIG.11
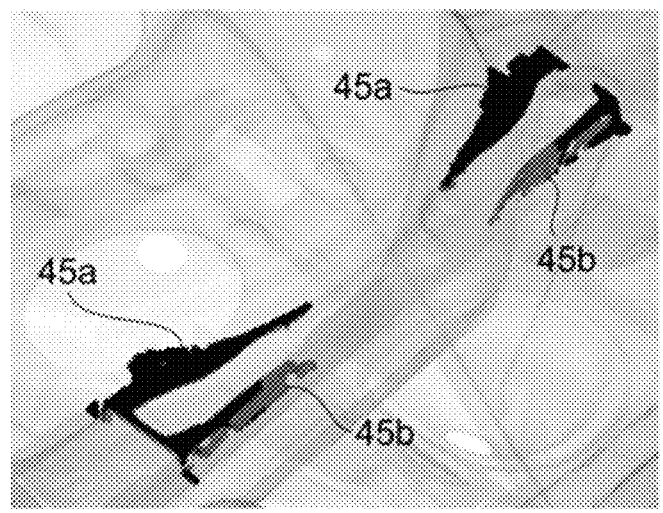
Case 2
OUTER LAYER: ALUMINUM ALLOY
INNER LAYER: STEEL
(a)
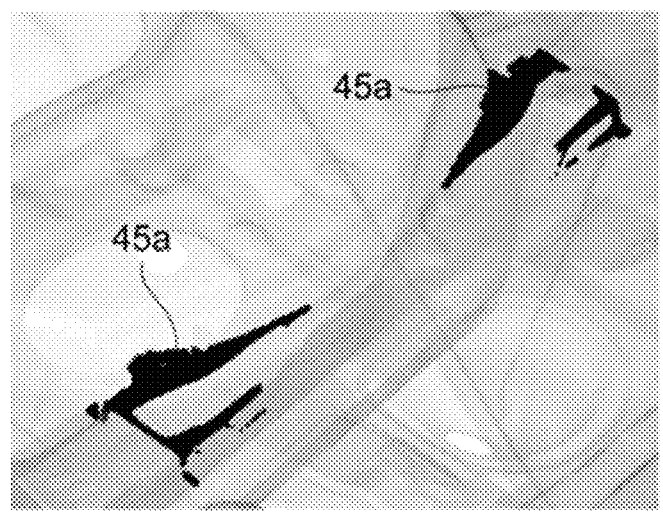
(b)
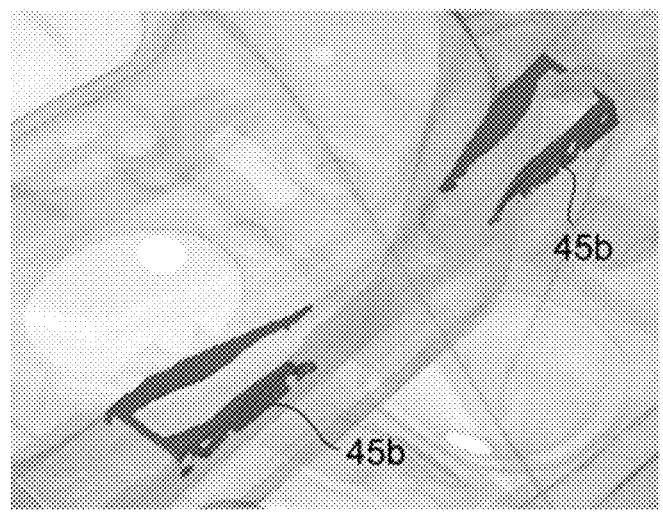
(c)

FIG.12
Case 3
OUTER LAYER: STEEL
INNER LAYER:
ALUMINUM ALLOY
(a)
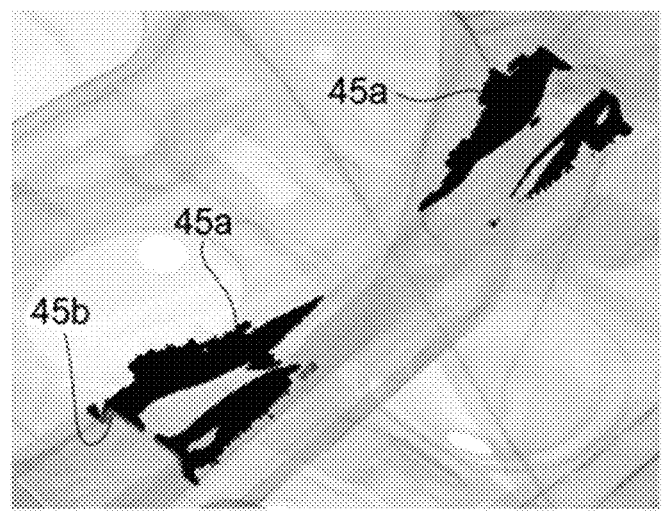
(b)
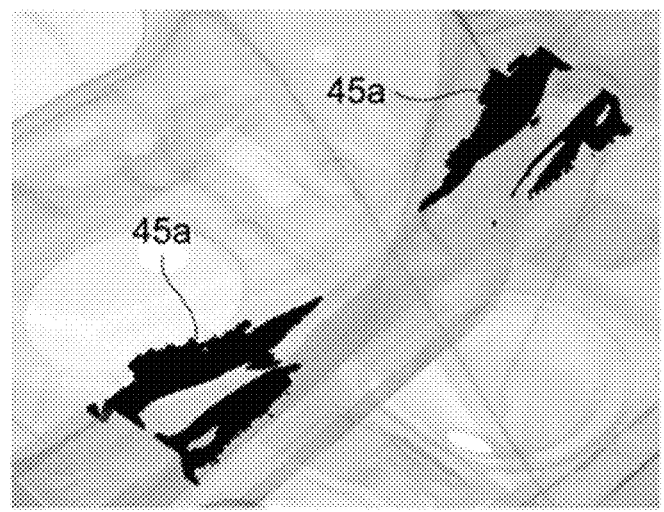
(c)
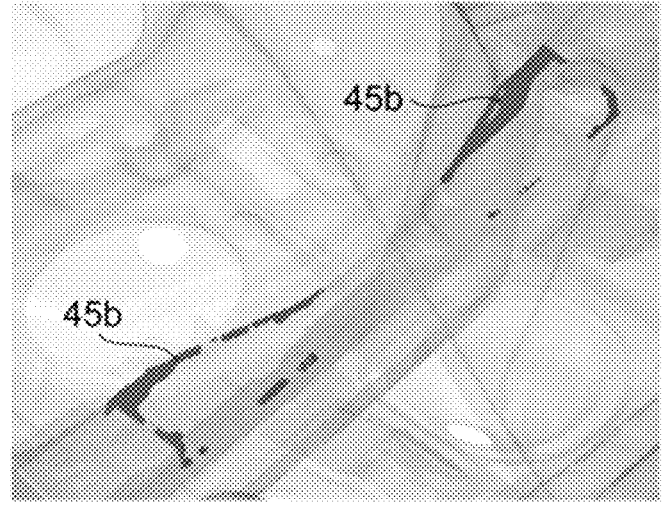

FIG.13
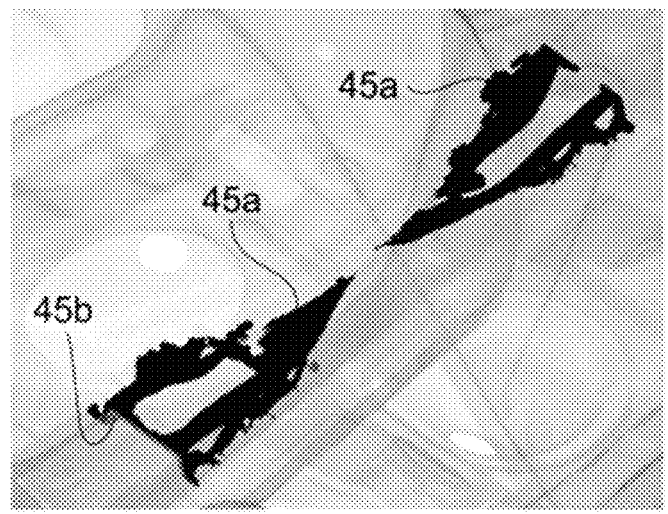
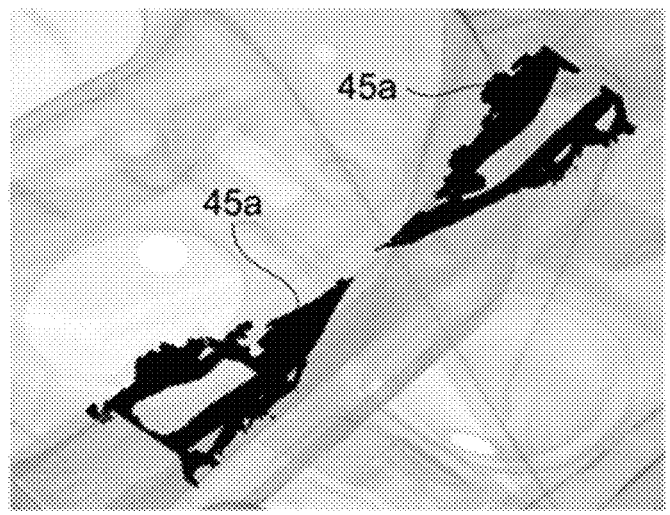
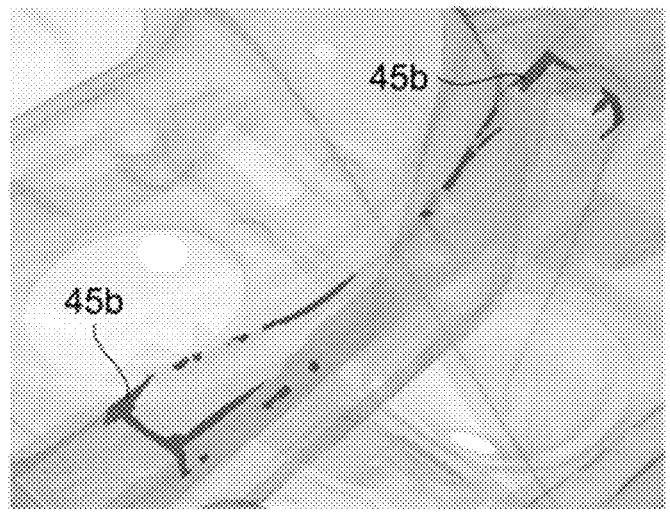

FIG.14
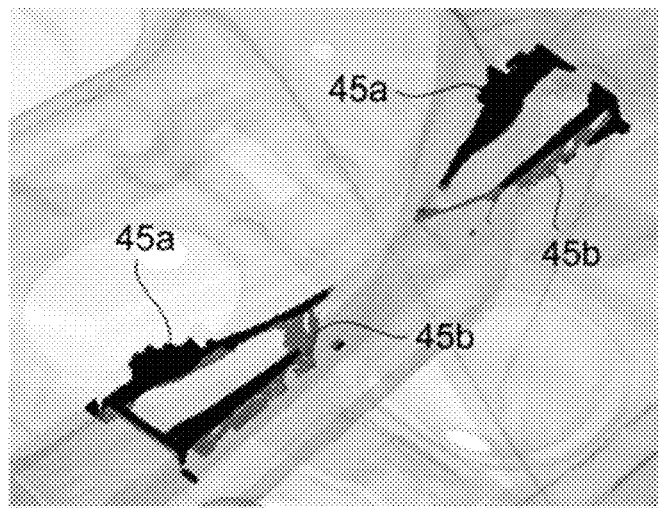
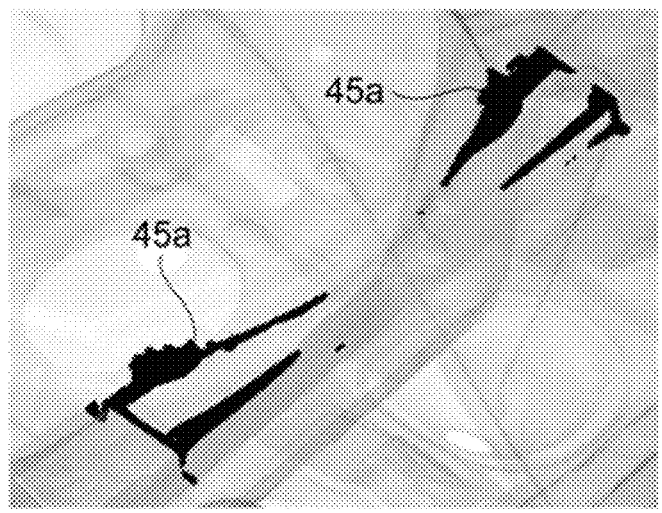
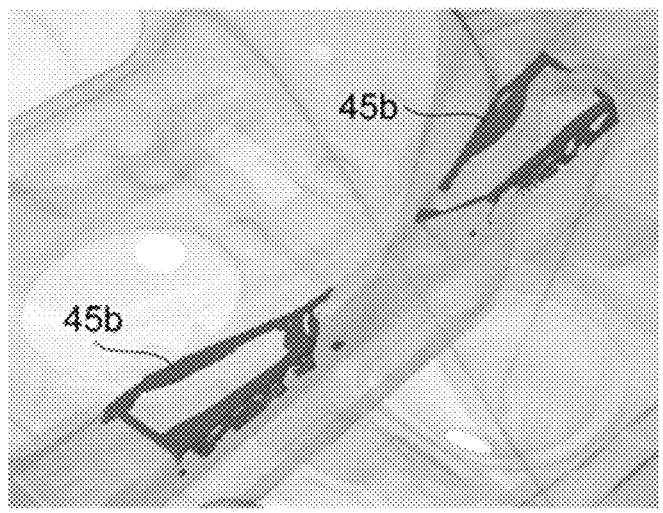

FIG.15
Case 6
OUTER LAYER: STEEL
INNER LAYER: GFRP
(a)
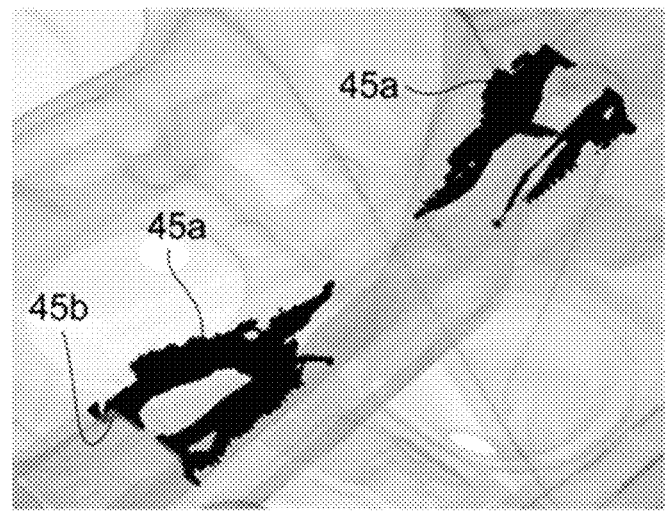
(b)
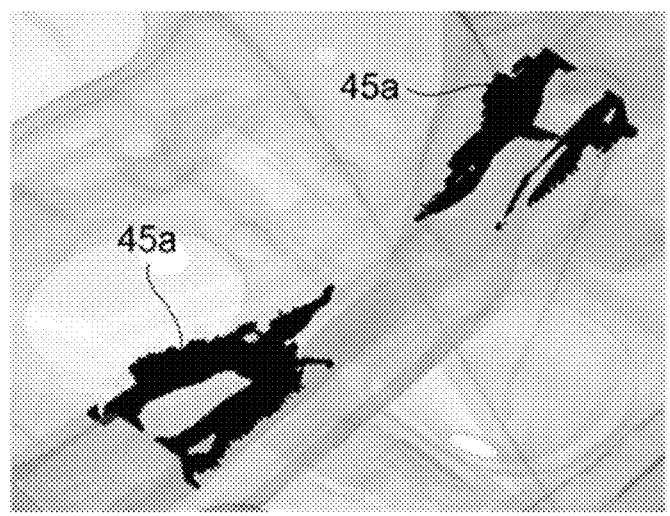
(c)
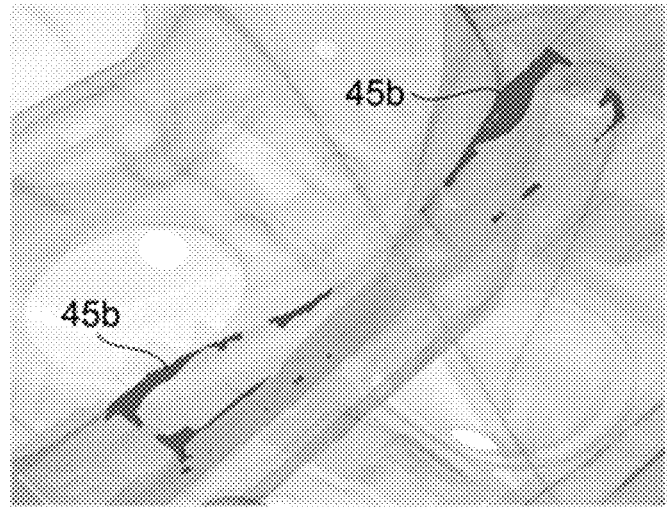

FIG.16
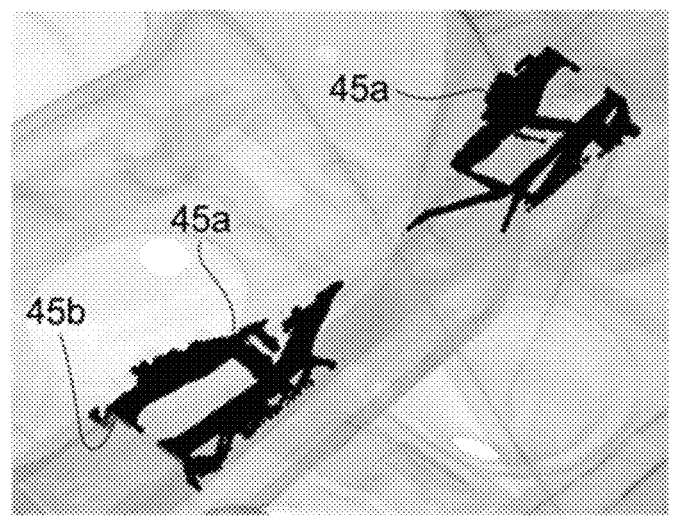
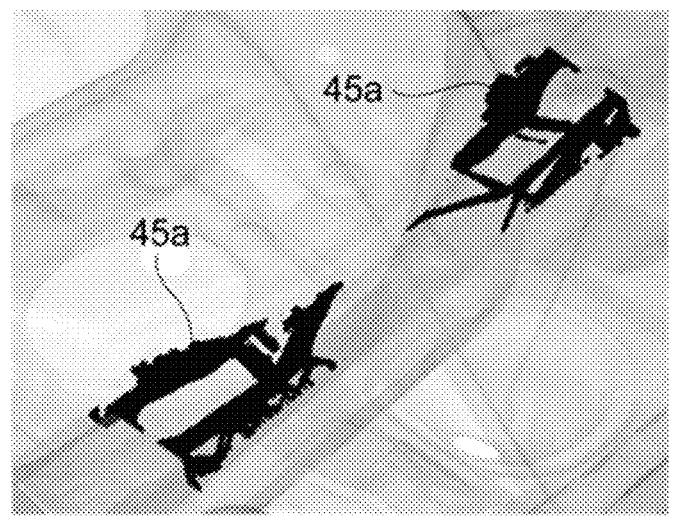
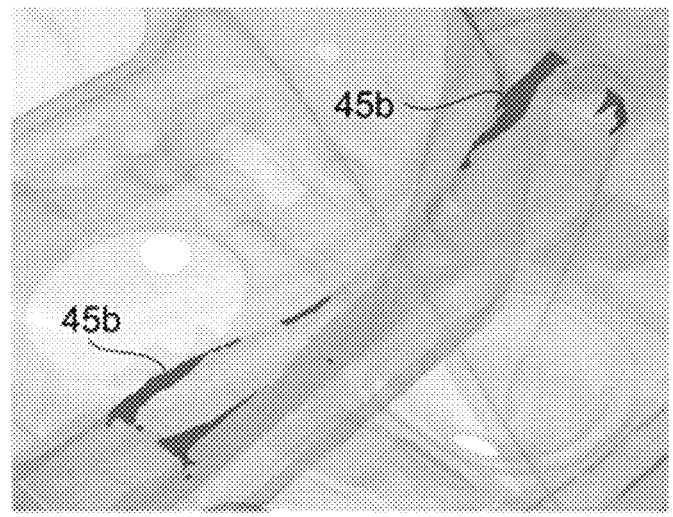

FIG.20
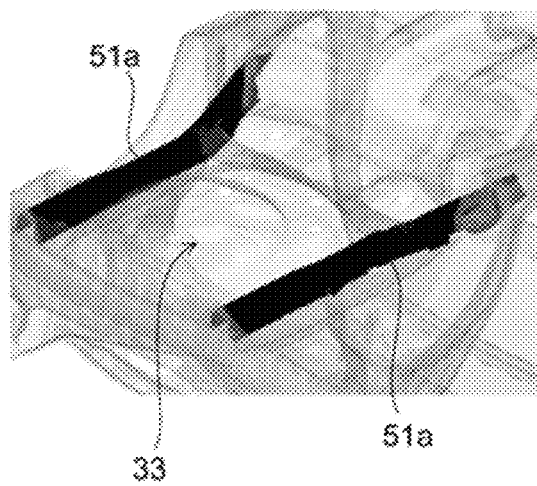
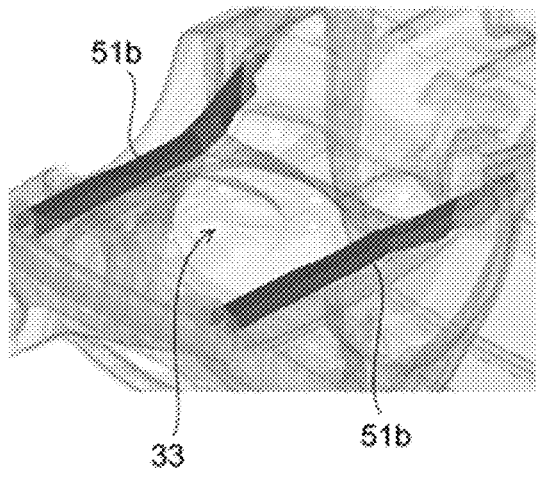
(a) OUTER LAYER
(b) INNER LAYER

FIG.22
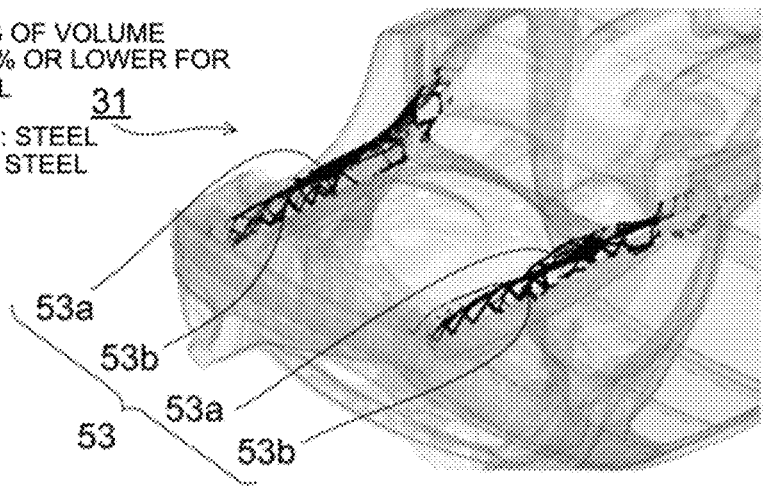
Case 1
CONSTRAINTS OF VOLUME
FRACTION: 20% OR LOWER FOR
ENTIRE MODEL
OUTER LAYER: STEEL
INNER LAYER: STEEL
(a)
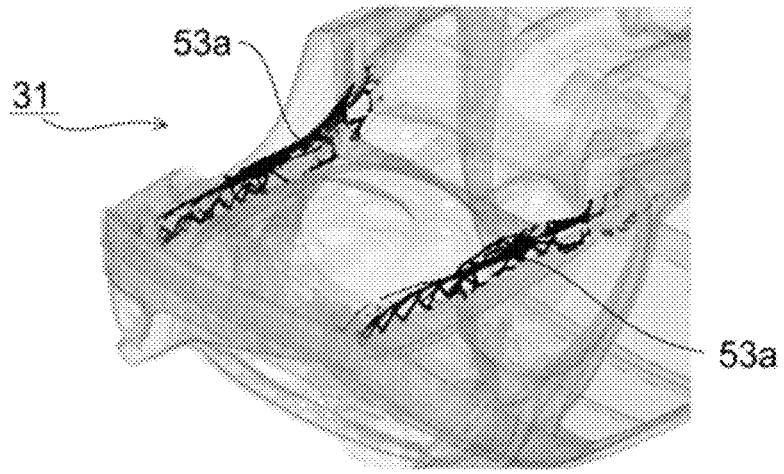
(b)
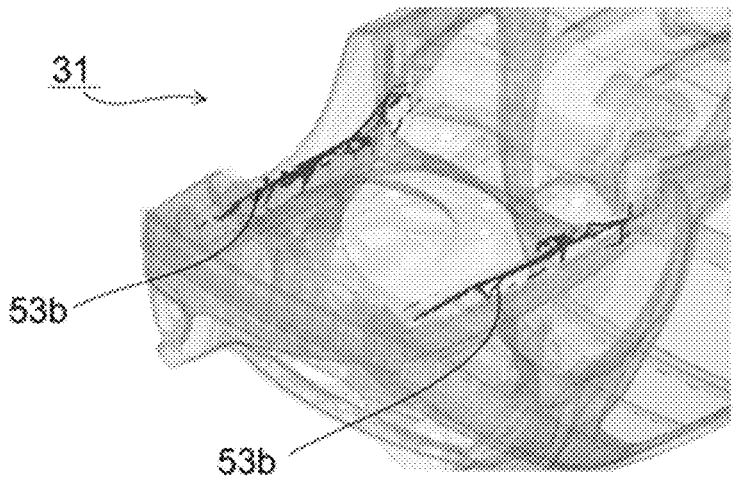
(c)

FIG.23
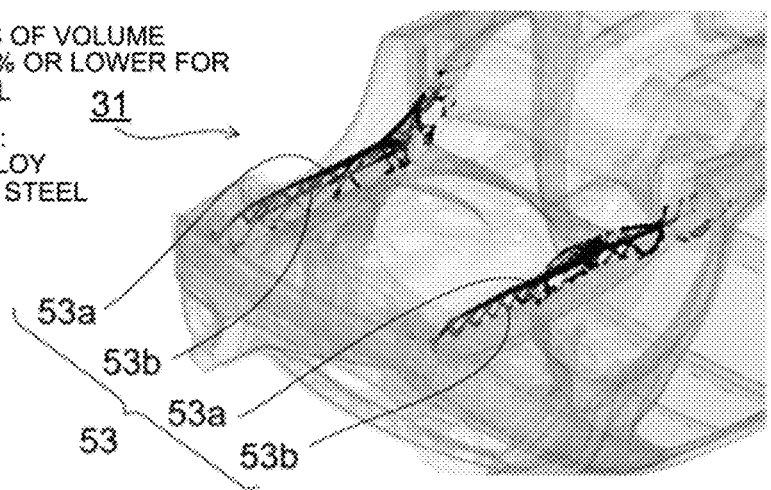
Case 2
CONSTRAINTS OF VOLUME
FRACTION: 20% OR LOWER FOR
ENTIRE MODEL
OUTER LAYER: ALUMINUM ALLOY
INNER LAYER: STEEL
(a)
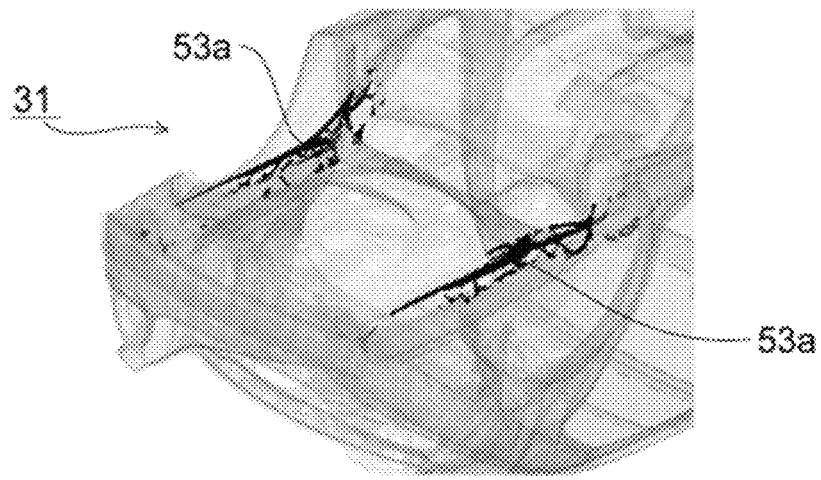
(b)
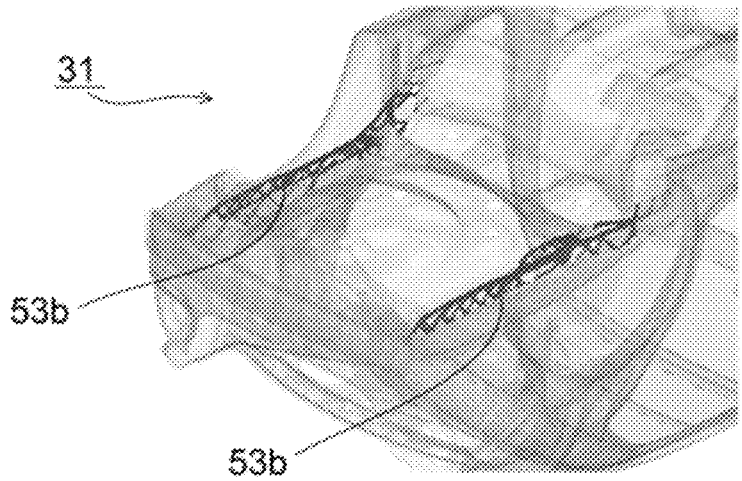
(c)

FIG.24
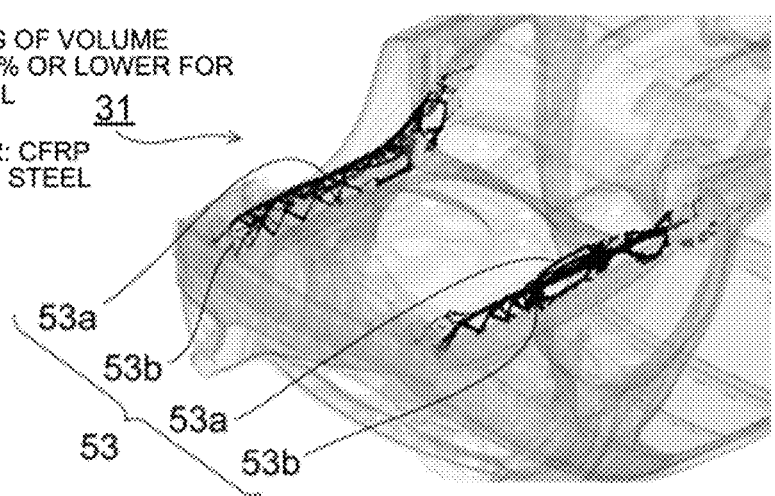
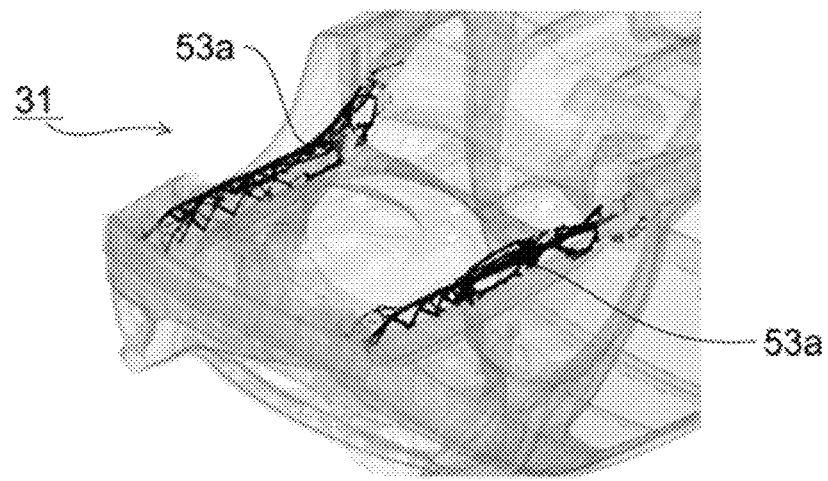
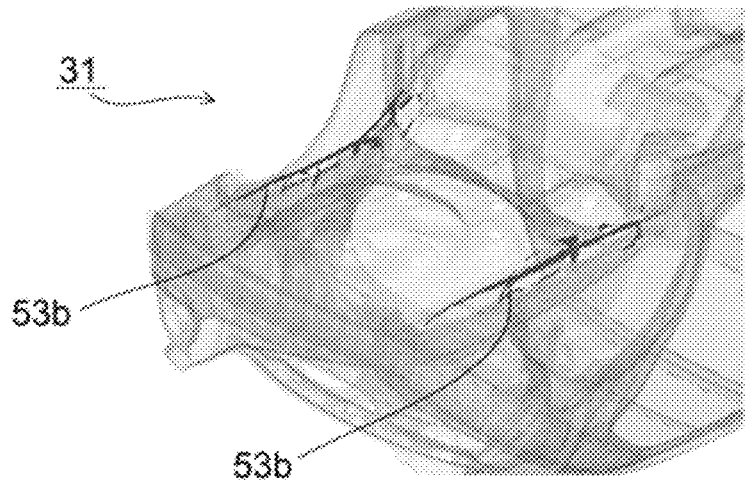

FIG.25
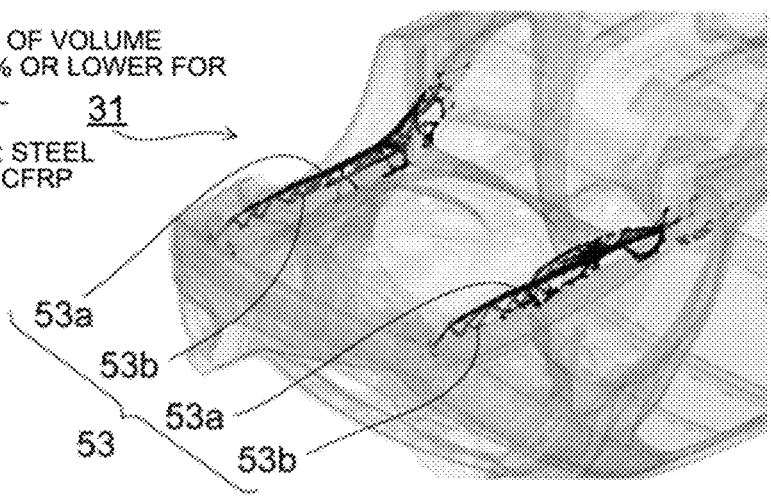
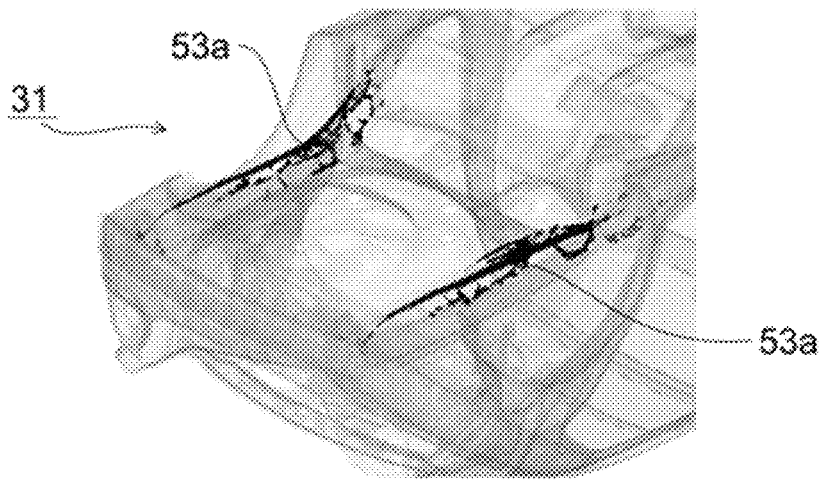
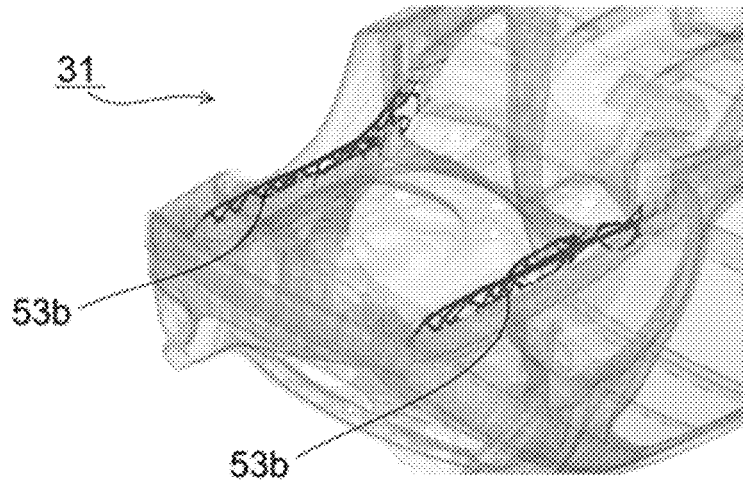

FIG.26
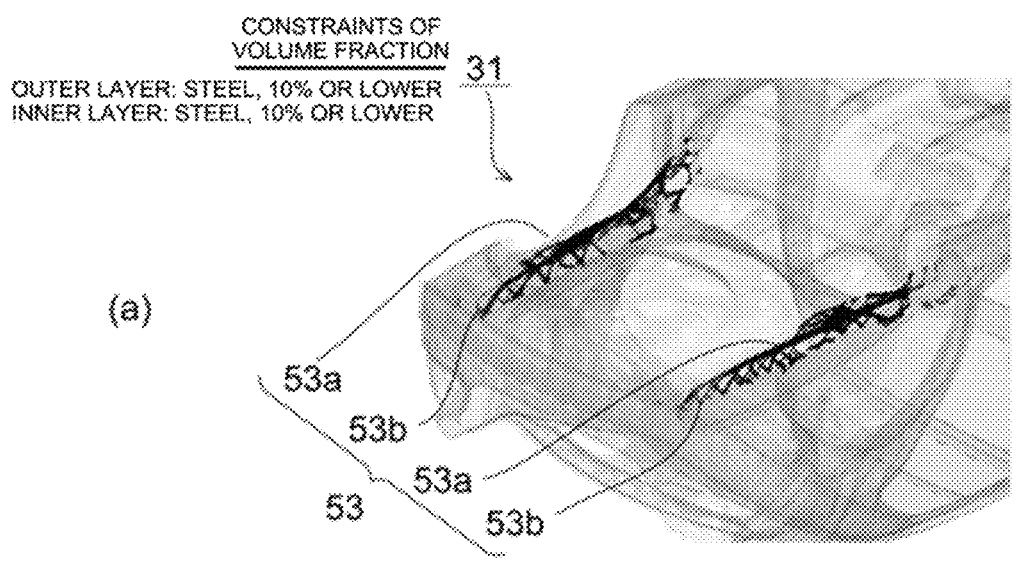
(a)
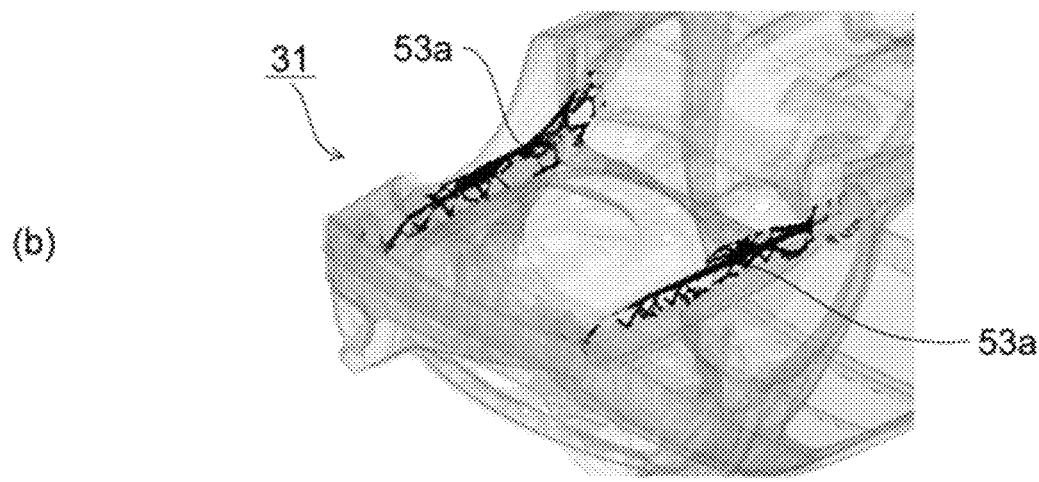
(b)
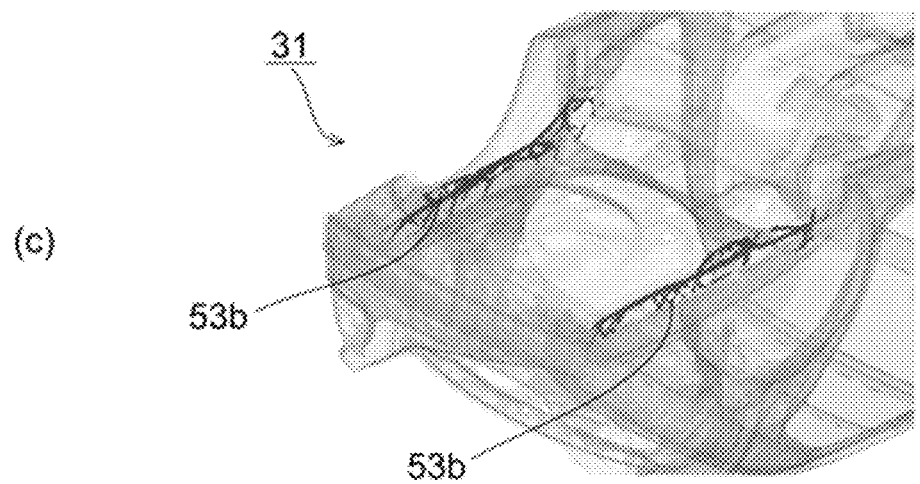
(c)

FIG.27
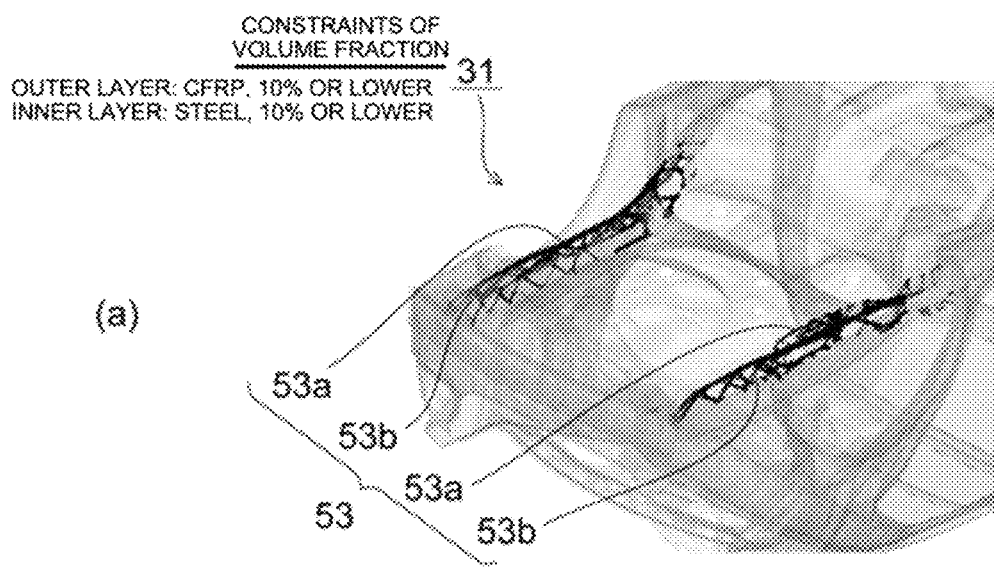
(a)
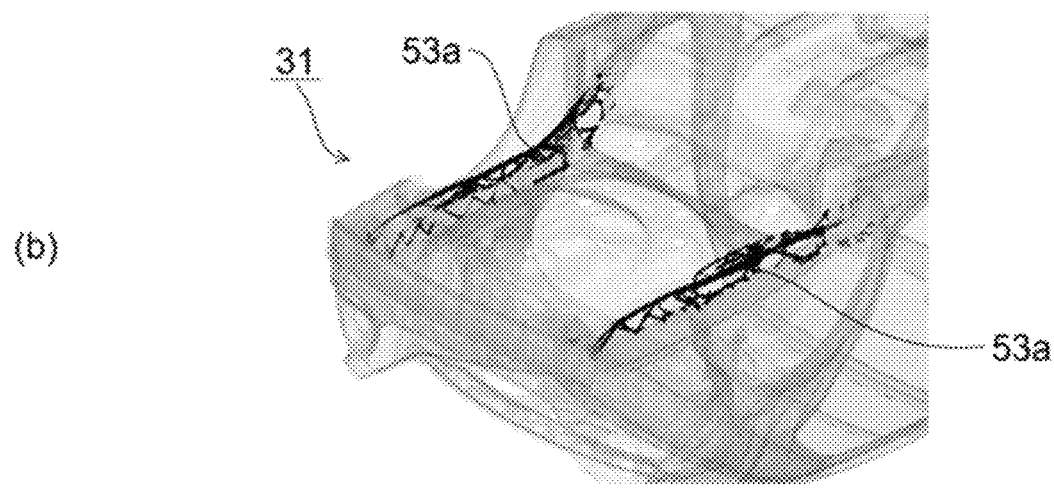
(b)
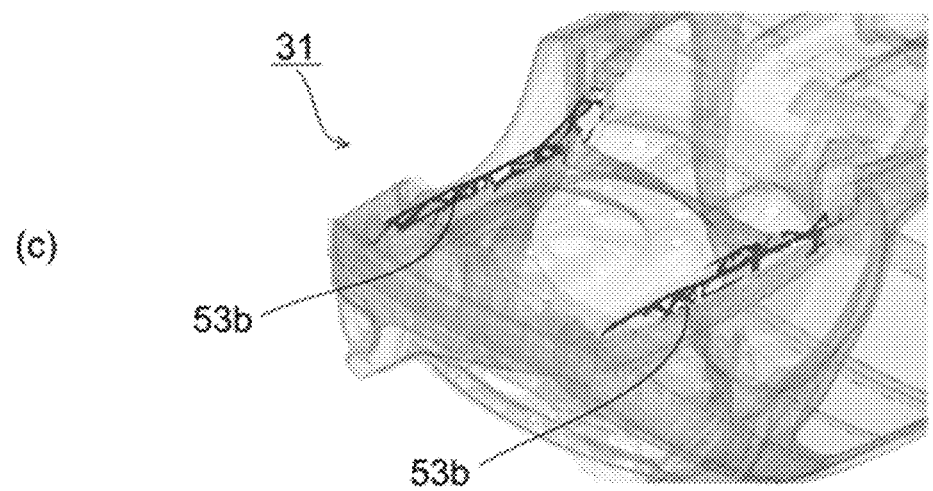
(c)

LAYERED-COMPOSITE-MEMBER SHAPE OPTIMIZATION ANALYSIS METHOD AND OPTIMIZATION ANALYSIS DEVICE

CROSS REFERENCE TO RELATED APPLICATIONS

This is the U.S. National Phase application of PCT/JP2018/028379, filed Jul. 30, 2018, which claims priority to Japanese Patent Application No. 2017-200795, filed Oct. 17, 2017, the disclosures of these applications being incorporated herein by reference in their entireties for all purposes.

FIELD OF THE INVENTION

The present invention relates to a layered-composite-member (layered composite member) shape optimization analysis (analysis of shape optimization) method and a layered-composite-member shape optimization analysis device, and particularly relates to a layered-composite-member shape optimization analysis method and a layered-composite-member shape optimization analysis device that set, at part of a structural body, a layered composite member in which layers having material properties different from each other are stacked, and determine an optimum shape of the layered composite member. In the present invention, shape optimization means, not determination of an optimum shape based on a predetermined shape such as a T-shape assumed in advance, but determination of an optimum shape that satisfies an analysis condition without assuming a predetermined shape.

BACKGROUND OF THE INVENTION

Recently, weight reduction of an automotive body attributable to environmental issues has been developed particularly in automobile industries, and analysis by computer aided engineering (hereinafter referred to as "CAE analysis") is an essential technology in automotive body designing. It is known that, in the CAE analysis, vehicle performance improvement such as weight reduction and stiffness improvement of an automotive body can be achieved by using optimization technologies such as mathematical optimization, thickness optimization, shape optimization, topology optimization, and these optimization technologies are often used in, for example, structural optimization of a cast metal such as an engine block.

Among the optimization technologies, topology optimization has been focused in particular. The topology optimization is a method of providing a design space having some size, incorporating a three-dimensional element in the design space, satisfying a provided condition, and leaving behind a minimum necessary part of the three-dimensional element to determine an optimum shape satisfying the condition. Thus, the topology optimization employs a method of directly applying constraint on the three-dimensional element forming the design space, and directly adding a load thereon.

Patent Literature 1 discloses, as a technology related to such topology optimization, a method for topology optimization of a component of a complicated structural body.

PATENT LITERATURE

Patent Literature 1: Japanese Patent Application Laid-open No. 2010-250818

Patent Literature 2: Japanese Patent Application Laid-open No. 2013-025533

Non Patent Literature

Non Patent Literature 1: YUGE, one other, "Optimum Design of a Construction Machine", Technical reports of Seikei University, Faculty of Engineering, Vol. 41, No. 1, 2004, pp. 1-5

SUMMARY OF THE INVENTION

A structural body such as an automotive body of an automobile is formed by mainly using a thin sheet. When the shape of a part of such an automotive body formed of a thin sheet is optimized by optimization technologies, the entire automotive body or part thereof as a target is taken out to be independent and optimization is performed while the independence is maintained, in conventional cases as disclosed in Non Patent Literature 1. However, with such a method, it is difficult to reflect a load and a constraint state from the entire automotive body to a design space thereof, and thus there has been a problem in that it is difficult to apply optimization technologies to a part of the automotive body. For example, even when optimization analysis of the entire automotive body is performed to determine an optimized shape of an interest part of the automotive body, there is a problem in that a part for which the optimization is performed is determined to be an unnecessary part in view of the entire automotive body and deleted. In addition, even when part of the automotive body is independently optimized, how the part is appropriately reflected to the automotive body having a thin sheet structure has been a problem.

The technology disclosed in Patent Literature 1 relates to a method and a physical system in mathematical calculation for optimization analysis by topology optimization, and provides no solution to the problem of thin sheet structure optimization as described above.

In addition, the conventional shape optimization has been targeted for metals such as steel, aluminum alloy, and magnesium alloy as disclosed in, for example, Patent Literature 2, but recently, a composite member in which resin and fiber-reinforced plastics (FRP) are stacked in layers and bonded to each other (in the present application, referred to as "layered composite member") has been used as a thin sheet forming an automotive body of an automobile to improve the stiffness and strength of the automotive body. However, no conventional technologies perform optimization on the shape of such a layered composite member, and thus it has been desired to develop an optimization technology of determining an optimized shape of the layered composite member.

Aspects of the present invention have been made in view of the above-described problems, and an object thereof is to provide a layered-composite-member shape optimization analysis method and a layered-composite-member shape optimization analysis device that determine an optimum shape of a layered composite member when the stiffness of part of a structural body as an automotive body is improved by using the layered composite member.

To solve the problem and achieve the object, a layered-composite-member shape optimization analysis method of obtaining, with a layered composite member, a model of part of a structural body model of an automotive body including a two-dimensional element or a two-dimensional element and a three-dimensional element, and performing optimization analysis on the shape of the layered composite member of the obtained model, the method executed by a computer according to aspects of the present invention includes: a design space setting step of setting, as a design space, an optimization target part of the structural body model of the automotive body; a layered block model generating step of generating a layered block model in the set design space, the layered block model including layers, each layer being a three-dimensional element and having material properties different from each other; a connection processing step of connecting the generated layered block model to the part of the structural body model of the automotive body; and an optimization analysis step of inputting an analysis condition, performing optimization analysis on the layered block model as an optimization analysis target, and determining an optimum shape of the layered block model.

Moreover, a layered-composite-member shape optimization analysis method of obtaining, with a layered composite member, a model of part of a structural body model of an automotive body including a two-dimensional element or a two-dimensional element and a three-dimensional element, and performing optimization analysis on the shape of the layered composite member of the obtained model, the method executed by a computer according to aspects of the present invention includes: a design space setting step of setting, as a plurality of design spaces stacked in lamination, an optimization target part of the structural body model of the automotive body; a layered block model generating step of providing material properties different from each other to the respective set design spaces to generate laminated block models each including a three-dimensional element, and connecting the laminated block models generated for the respective design spaces to generate a layered block model including the three-dimensional element; a connection processing step of connecting the generated layered block model to the structural body model of the automotive body; and an optimization analysis step of inputting an analysis condition, performing optimization analysis on the layered block model as an optimization analysis target, and determining an optimum shape of the layered block model.

Moreover, in the layered-composite-member shape optimization analysis method according to aspects of the present invention, the layered block model is obtained by: coupling the layers, each layer being a three-dimensional element and having material properties different from each other, by using a rigid element, a beam element, or a two-dimensional element; or coupling the layers by sharing nodal points of the layers.

Moreover, in the layered-composite-member shape optimization analysis method according to aspects of the present invention, the layered block model is obtained by: coupling the laminated block models generated for the respective design spaces and each including a three-dimensional element by using a rigid element, a beam element, or a two-dimensional element; or coupling the laminated block models by sharing nodal points of the laminated block models.

Moreover, in the layered-composite-member shape optimization analysis method according to aspects of the present invention, the layered block model includes a three-dimensional element that is one of a penta-hedron to an octa-hedron having at least one pair of two surfaces parallel to each other.

Moreover, in the layered-composite-member shape optimization analysis method according to aspects of the present invention, the layered block model is generated so that a surface parallel to surfaces surrounding the design space set at the part of the structural body model of the automotive body has maximum area.

Moreover, in the layered-composite-member shape optimization analysis method according to aspects of the present invention, the layered block model is generated by disposing nodal points at connection parts with the two-dimensional elements or three-dimensional elements of the part of the structural body model of the automotive body, using hexahedral three-dimensional elements as the three-dimensional elements of the layered block model, and stacking three-dimensional elements along a plane including the nodal points disposed at the connection parts.

Moreover, in the layered-composite-member shape optimization analysis method according to aspects of the present invention, the optimization analysis step performs discretization with an optimization parameter in optimization analysis.

Moreover, in the layered-composite-member shape optimization analysis method according to aspects of the present invention, the optimization analysis step performs optimization analysis by topology optimization.

Moreover, a layered-composite-member shape optimization analysis device configured to obtain, with a layered composite member, a model of part of a structural body model of an automotive body including a two-dimensional element or a two-dimensional element and a three-dimensional element, and perform optimization analysis on the shape of the layered composite member of the obtained model according to aspects of the present invention includes: a design space setting unit configured to set, as a design space, an optimization target part of the structural body model of the automotive body; a layered block model generation unit configured to generate a layered block model in the set design space, the layered block model including layers, each layer being a three-dimensional element and having material properties different from each other; a connection processing unit configured to connect the generated layered block model to the part of the structural body model of the automotive body; and an optimization analysis unit configured to input an analysis condition, perform optimization analysis on the layered block model as an optimization analysis target, and determine an optimum shape of the layered block model.

Moreover, a layered-composite-member shape optimization analysis device configured to obtain, with a layered composite member, a model of part of a structural body model of an automotive body including a two-dimensional element or a two-dimensional element and a three-dimensional element, and perform optimization analysis on the shape of the layered composite member of the obtained model according to aspects of the present invention includes: a design space setting unit configured to set, as a plurality of design spaces stacked in lamination, an optimization target part of the structural body model of the automotive body; a layered block model generation unit configured to provide material properties different from each other to the respective set design spaces to generate laminated block models each including a three-dimensional element, and configured to connect the laminated block models generated for the respective design spaces to generate a layered block model including the three-dimensional element; a connection processing unit configured to connect the generated layered block model to the part of the structural body model of the automotive body; and an optimization analysis unit configured to input an analysis condition, perform optimization analysis on the layered block model as an optimization analysis target, and determine an optimum shape of the layered block model.

Moreover, in the layered-composite-member shape optimization analysis device according to aspects of the present invention, the layered block model is obtained by: coupling the layers, each layer being a three-dimensional element and having material properties different from each other, by using a rigid element, a beam element, or a two-dimensional element; or coupling the layers by sharing nodal points of the layers.

Moreover, in the layered-composite-member shape optimization analysis device according to aspects of the present invention, the layered block model is obtained by: coupling the laminated block models generated for the respective design spaces and each including a three-dimensional element by using a rigid element, a beam element, or a two-dimensional element; or coupling the laminated block models by sharing nodal points of the laminated block models.

Moreover, in the layered-composite-member shape optimization analysis device according to aspects of the present invention, the layered block model includes a three-dimensional element that is one of a penta-hedron to an octa-hedron having at least one pair of two surfaces parallel to each other.

Moreover, in the layered-composite-member shape optimization analysis device according to aspects of the present invention, the layered block model is generated so that a surface parallel to surfaces surrounding the design space set at the part of the structural body model of the automotive body has maximum area.

Moreover, in the layered-composite-member shape optimization analysis device according to aspects of the present invention, the layered block model is generated by disposing nodal points at connection parts with the two-dimensional elements or three-dimensional elements of the part of the structural body model of the automotive body, using hexahedral three-dimensional elements as the three-dimensional elements of the layered block model, and stacking three-dimensional elements along a plane including the nodal points disposed at the connection parts.

Moreover, in the layered-composite-member shape optimization analysis device according to aspects of the present invention, the optimization analysis unit performs discretization with an optimization parameter in optimization analysis.

Moreover, in the layered-composite-member shape optimization analysis device according to aspects of the present invention, the optimization analysis unit performs optimization analysis by topology optimization.

According to aspects of the present invention, it is possible to determine an optimum shape of a layered composite member as part of an automotive body when external force acts on a structural body as the automotive body, improve predetermined performance of the structural body, and achieve weight reduction of the structural body while the predetermined performance is maintained.

BRIEF DESCRIPTION OF THE DRAWINGS

FIG. 10 is a diagram illustrating analysis results of an optimum shape obtained through the optimization analysis on the rear cross member in the embodiment (Case 1, outer layer: steel (steel sheet), inner layer: steel).

FIG. 11 is a diagram illustrating analysis results of an optimum shape obtained through the optimization analysis on the rear cross member in the embodiment (Case 2, outer layer: aluminum alloy, inner layer: steel).

FIG. 12 is a diagram illustrating analysis results of an optimum shape obtained through the optimization analysis on the rear cross member in the embodiment (Case 3, outer layer: steel, inner layer: aluminum alloy).

FIG. 13 is a diagram illustrating analysis results of an optimum shape obtained through the optimization analysis on the rear cross member in the embodiment (Case 4, outer layer: CFRP, inner layer: steel).

FIG. 14 is a diagram illustrating analysis results of an optimum shape obtained through the optimization analysis on the rear cross member in the embodiment (Case 5, outer layer: steel, inner layer: CFRP).

FIG. 15 is a diagram illustrating analysis results of an optimum shape obtained through the optimization analysis on the rear cross member in the embodiment (Case 6, outer layer: steel, inner layer: GFRP).

FIG. 16 is a diagram illustrating analysis results of an optimum shape obtained through the optimization analysis on the rear cross member in the embodiment (Case 7, outer layer: steel, inner layer: resin).

FIG. 20 is a diagram (2) illustrating the design space in which the rear side member of the automotive body model is set as a target in the embodiment ((a) outer layer, (b) inner layer).

FIG. 22 is a diagram illustrating analysis results of an optimum shape obtained through the optimization analysis on the rear side member in the embodiment (Case 1, outer layer: steel, inner layer: steel).

FIG. 23 is a diagram illustrating analysis results of an optimum shape obtained through the optimization analysis on the rear side member in the embodiment (Case 2, outer layer: aluminum alloy, inner layer: steel).

FIG. 24 is a diagram illustrating analysis results of an optimum shape obtained through the optimization analysis on the rear side member in the embodiment (Case 4, outer layer: CFRP, inner layer: steel).

FIG. 25 is a diagram illustrating analysis results of an optimum shape obtained through the optimization analysis on the rear side member in the embodiment (Case 5, outer layer: steel, inner layer: CFRP).

FIG. 26 is a diagram illustrating analysis results of an optimum shape obtained through the optimization analysis on the rear side member in the embodiment (Case 1, constraint condition: the constraints of volume fraction are 10% or lower for each of the outer layer and the inner layer).

FIG. 27 is a diagram illustrating analysis results of an optimum shape obtained through the optimization analysis on the rear side member in the embodiment (Case 4, constraint condition: the constraints of volume fraction are 10% or lower for each of the outer layer and the inner layer).

DETAILED DESCRIPTION OF EMBODIMENTS OF THE INVENTION

The following describes an exemplary automotive-body structural body model (hereinafter simply referred to as "structural body model") according to aspects of the present invention before description of a layered-composite-member shape optimization analysis method and a layered-composite-member shape optimization analysis device according to an embodiment of the present invention.

<Structural Body Model>

A structural body model is obtained by modeling a structural body by using a two-dimensional element and/or a three-dimensional element when a layered composite member made of a material different from that of the structural body is connected to part of the structural body. The present embodiment is targeted for an automotive body model 31 illustrated in FIG. 2 as an exemplary structural body model.

The automotive body model 31 includes a plurality of components such as an automotive body frame member and a chassis component of an automobile, and each component of the automotive body model 31 is modeled with two-dimensional elements and/or three-dimensional elements. Information related to elements (two-dimensional and three-dimensional elements), material properties, and the like of each component included in the automotive body model 31 is stored in a structural body model file 21 (refer to FIG. 1).

<Layered-Composite-Member Shape Optimization Analysis Device>

The following describes the configuration of a layered-composite-member shape optimization analysis device 1 (hereinafter simply referred to as "shape optimization analysis device 1") according to the present embodiment based on FIGS. 1 to 8.

Figure 1:
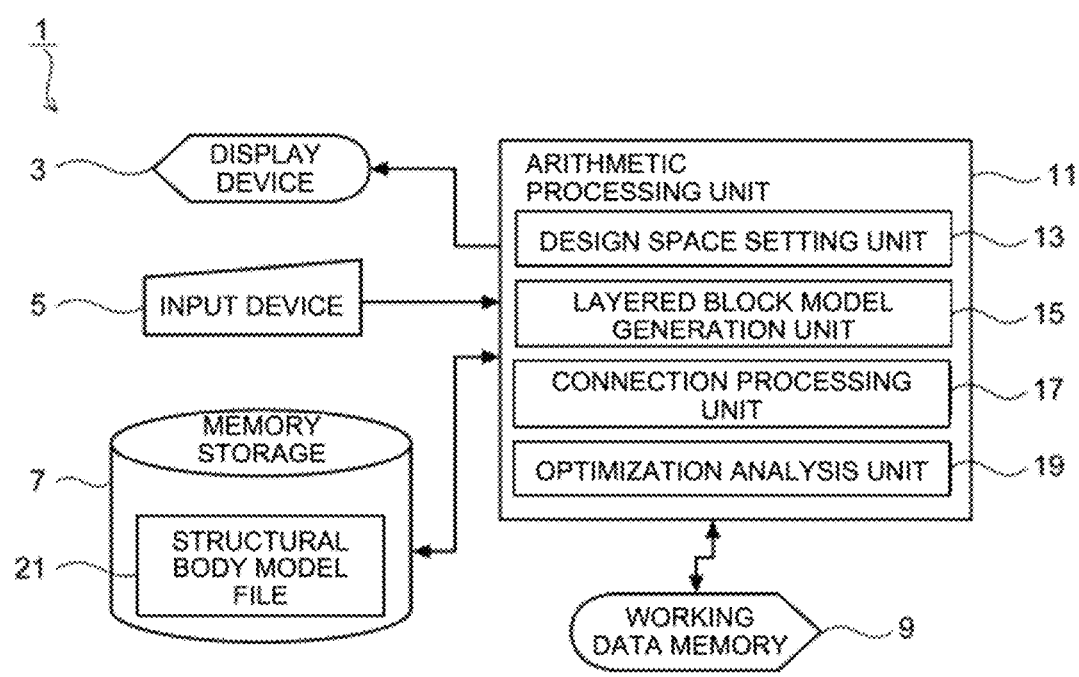
FIG. 1 is a block diagram of a layered-composite-member shape optimization analysis device according to an embodiment of the present invention.

The shape optimization analysis device 1 according to the present embodiment determines an optimum shape of a layered composite member made of a material different from that of the part of a structural body as an automotive body when the structural body is stiffened by connecting the layered composite member to part of the structural body. As illustrated in FIG. 1, the shape optimization analysis device 1 according to the present embodiment is achieved by a computer such as a personal computer (PC) and includes a display device 3, an input device 5, a memory storage 7, a working data memory 9, and an arithmetic processing unit 11. The display device 3, the input device 5, the memory storage 7, and the working data memory 9 are connected with the arithmetic processing unit 11, and each function thereof is executed by a command from the arithmetic processing unit 11.

Figure 2:
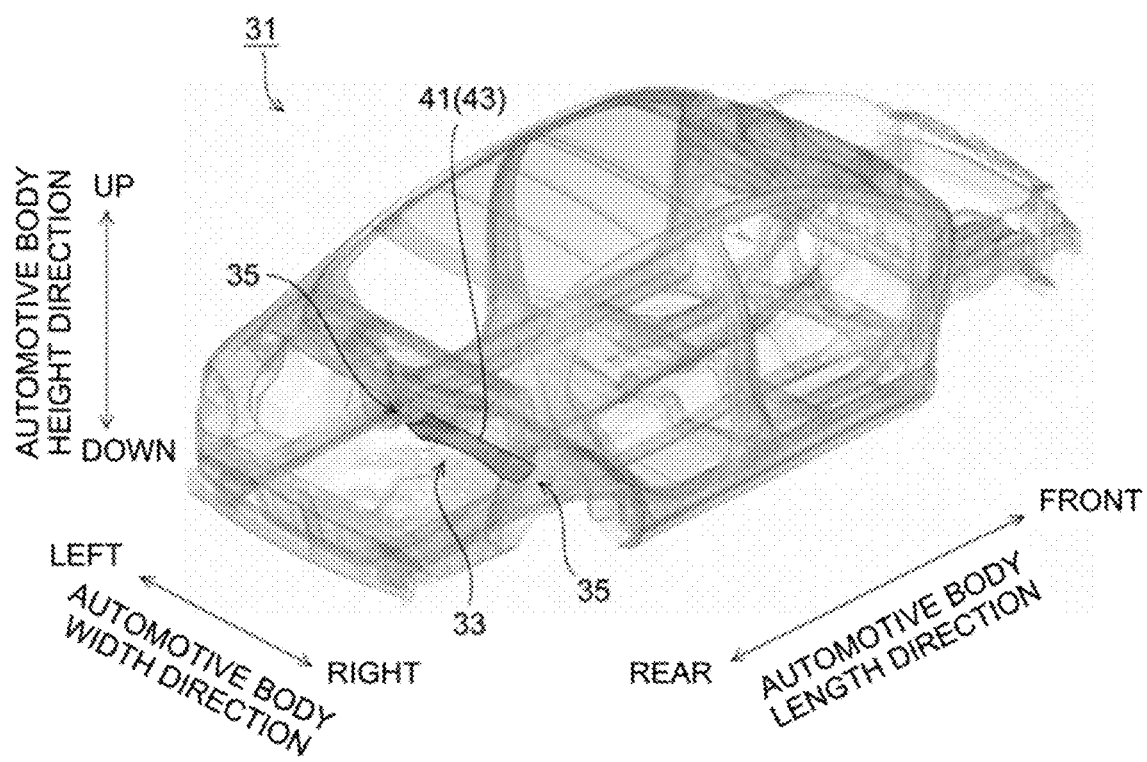
FIG. 2 is a diagram for description of an automotive body model as an exemplary shape optimization analysis target and a design space set to the automotive body model in the embodiment.

The following describes each configuration of the shape optimization analysis device 1 according to the present embodiment based on an example in which a model of a rear cross member (design space 41) as part of the automotive body model 31 illustrated in FIG. 2 is produced with a layered composite member and an optimum shape of the layered composite member is determined.

<<Display Device>>

The display device 3 is used for, for example, analysis result display and achieved by a liquid crystal monitor or the like.

<<Input Device>>

The input device 5 is used for, for example, display instruction for the structural body model file 21 and condition input from an operator, and is achieved by a keyboard, a mouse, or the like.

<<Memory Storage>>

The memory storage 7 is used for, for example, storage of various files including the structural body model file 21, and is achieved by a hard disk or the like.

<<Working Data Memory>>

The working data memory 9 is used for temporary storage and computation of data used at the arithmetic processing unit 11, and is achieved by a random access memory (RAM) or the like.

<<Arithmetic Processing Unit>>

As illustrated in FIG. 1, the arithmetic processing unit 11 includes a design space setting unit 13, a layered block model generation unit 15, a connection processing unit 17, and an optimization analysis unit 19, and is achieved by a central processing unit (CPU) of a PC or the like. These units each function as the CPU executes a predetermined computer program. The above-described function of each unit in the arithmetic processing unit 11 is described below.

(Design Space Setting Unit)

The design space setting unit 13 sets an optimization target part as a design space at part of a structural body model. The design space setting unit 13 deletes a part to be set as an optimization target in the structural body model and sets the design space at the deleted part.

FIG. 2 illustrates an example in which the design space 41 of the rear cross member is set as the structural body model at part of the automotive body model 31. In FIG. 2, the rear cross member originally included in the automotive body model 31 is deleted, and the design space 41 is set at the deleted part.

Before the deletion, an upper surface side of the rear cross member in a height direction of the automotive body is joined with a floor panel 33, and right and left ends thereof in a width direction of the automotive body are connected with a rear side member 35. When the design space 41 is set, the floor panel 33 and the rear side member 35 are not deleted but remain.

Thus, the design space 41 can be set as a space surrounded by a surface having a shape along the floor panel 33, a surface having a shape along the rear side member 35, and a surface provided to extend to the limit of a designing possible range. The designing possible range can be set as appropriate based on, for example, the shape of the original rear cross member and a gap from any other component around the rear cross member.

In the above-described example, the design space setting unit 13 sets the design space 41 by deleting the rear cross member as part of the automotive body model 31 acquired from the structural body model file 21, but the design space 41 may be set in advance when the automotive body model 31 is generated. In such a case, the design space setting unit 13 may have a function to generate the automotive body model 31.

(Layered Block Model (Laminated Block Model) Generation Unit)

The layered block model generation unit 15 generates, in the set design space 41, a layered block model 43 that includes a three-dimensional element and in which a plurality of layers having material properties different from each other are stacked. The layered block model 43 is a model produced with the layered composite member, and is a target on which optimization analysis processing is performed.

The layered block model generation unit 15 can generate the layered block model 43 having an optional shape and a size smaller than the design space 41. In the generation of the layered block model 43, the layered block model generation unit 15 first sets a plurality of layers each including a three-dimensional element and stacks the layers in lamination by coupling the layers by using a rigid element, a beam element, or a two-dimensional element or by coupling the layers by sharing nodal points of the three-dimensional elements of the layers.

Each three-dimensional element used for the layered block model 43 is a polyhedron having surfaces in a number corresponding to one of a penta-hedron to an octa-hedron, and is preferably a three-dimensional element including at least one pair of two surfaces parallel to each other.

This is because, when a part at which the design space 41 is formed is a laminated member like the layered composite member, an optimum shape that can be reflected on the shape of the layered composite member is desirably obtained through execution of the optimization analysis processing for the layered block model 43. Such a request is likely to be fulfilled by using a three-dimensional element that is one of a penta-hedron to an octa-hedron and includes at least one pair of two surfaces parallel to each other.

In addition, one of a penta-hedral to an octa-hedral three-dimensional elements are preferably generated in sizes uniform as much as possible in the design space 41 to increase the accuracy of optimization. Meanwhile, the present invention does not exclude use of polyhedral three-dimensional elements other than one of penta-hedral to an octa-hedral three-dimensional elements, for example, use of tetrahedral three-dimensional elements.

Figure 3:
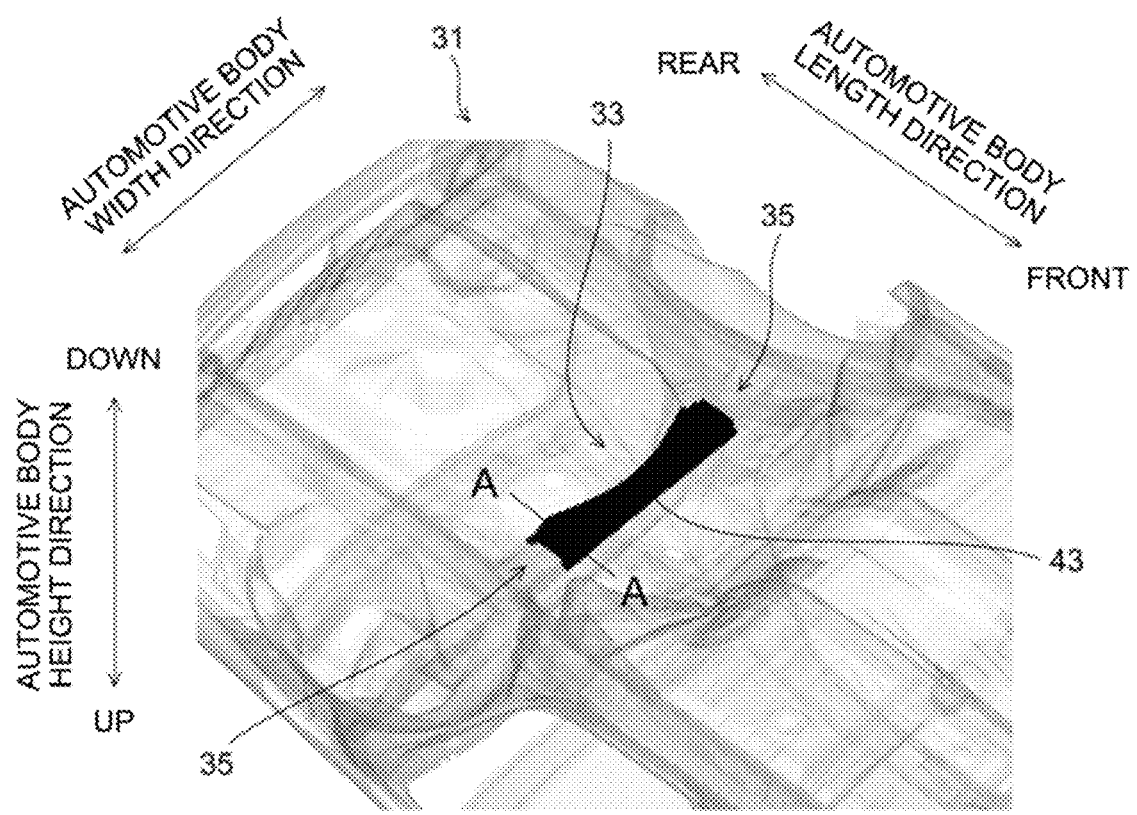
FIG. 3 is a diagram (1) for description of the design space set to the automotive body model in the embodiment.
Figure 4:
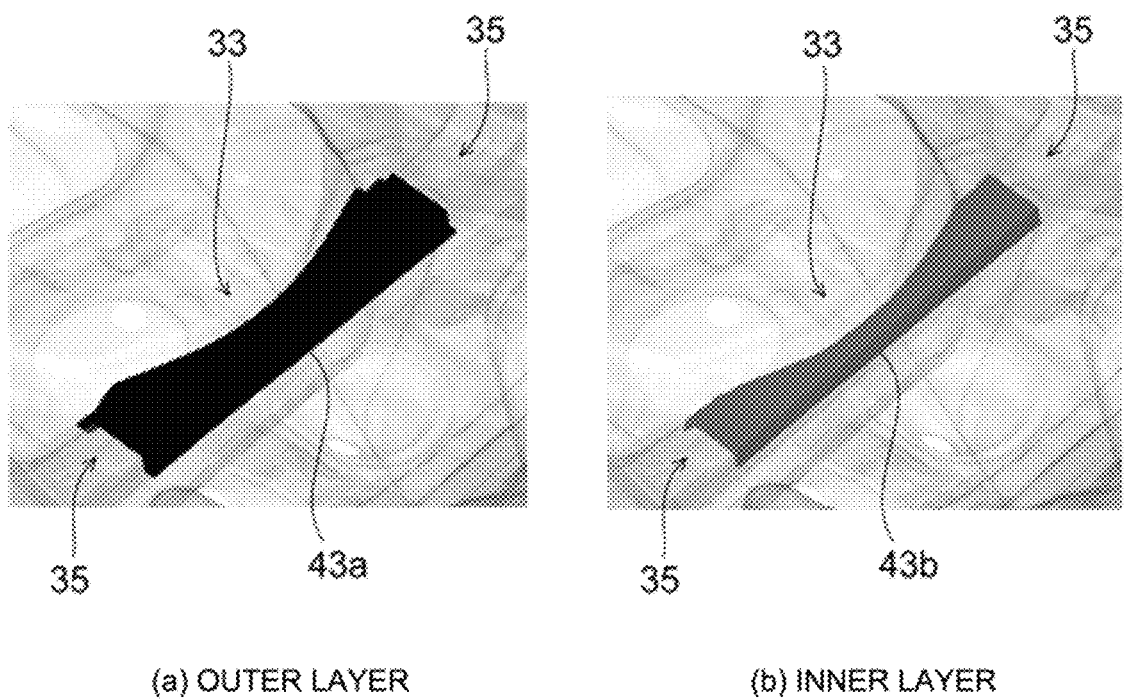
FIG. 4 is a diagram (2) for description of the design space set to the automotive body model in the embodiment ((a) outer layer, (b) inner layer).
Figure 5:
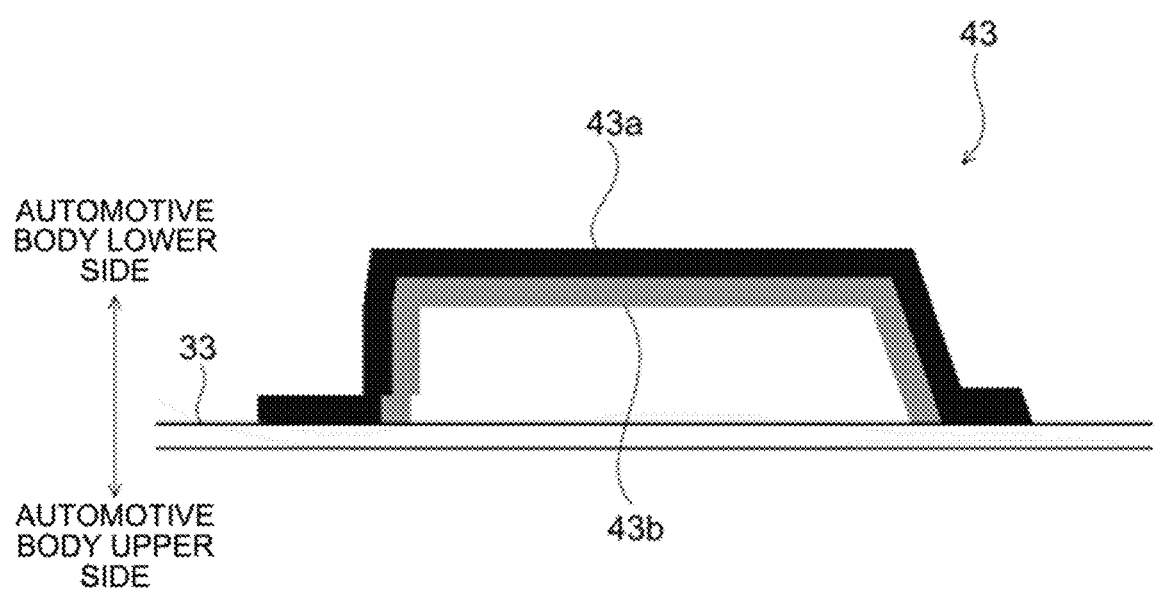
FIG. 5 is a cross-sectional view of the design space set to the automotive body model in the embodiment.

FIGS. 3 to 5 illustrate an example in which the layered block model 43 is generated in the design space 41 illustrated in FIG. 2. FIG. 3 illustrates the automotive body model 31 from the lower side in the height direction of the automotive body, FIG. 4 illustrates an outer layer 43*a* and an inner layer 43*b* of the layered block model 43, and FIG. 5 is a cross-sectional view orthogonal to the width direction of the automotive body in the layered block model 43.

As illustrated in FIGS. 4 and 5, the layered block model 43 is generated from the outer layer 43*a* and the inner layer 43*b* having material properties different from each other, and the outer layer 43*a* and the inner layer 43*b* are layered in an overlapping manner in lamination. The outer layer 43*a* and the inner layer 43*b* are each made of three-dimensional elements, and in the present embodiment, the outer layer 43*a* and the inner layer 43*b* are connected with each other to share nodal points of the three-dimensional elements.

Examples of the material properties set to the outer layer 43*a* and the inner layer 43*b* of the layered block model 43 may include Young's modulus, Poisson's ratio, the specific gravity, and the like. For example, when the material of each layer of the layered composite member as a modeling target has in-plane anisotropy as a material property like FRP, the in-plane anisotropy can be set by providing the angle of principal axis that provides the in-plane anisotropy as a material property of each of the outer layer 43*a* and the inner layer 43*b* of the layered block model 43 and setting the value of the material property corresponding to the angle of principal axis. The angle of principal axis can be set for each of the outer layer 43*a* and the inner layer 43*b*.

The layered block model generation unit 15 preferably generates the layered block model 43 so that three-dimensional elements are segmentalized along surfaces surrounding the design space 41 set in the automotive body model 31 and in parallel to a surface of the design space 41 having the maximum area. The surfaces surrounding the set design space 41 are surfaces of a component (in the present embodiment, the rear cross member) at a part where the design space 41 is to be set, and the surface of the design space having the maximum area is a surface having the maximum area among the surrounding surfaces.

For example, when the design space 41 is set for the rear cross member in the automotive body model 31, the surfaces surrounding the set design space 41 include a surface along the floor panel 33 with which the rear cross member is joined and a surface along the rear side member 35. The area of the surface along the floor panel 33 is larger than that of the surface along the rear side member 35, and thus the surface along the floor panel 33 can be determined as the surface having the maximum area in the design space 41.

The layered block model generation unit 15 may generate the layered block model 43 by using hexahedral three-dimensional elements as the three-dimensional elements included in the layered block model 43, disposing nodal points of the hexahedral three-dimensional elements at connection parts with two-dimensional elements or three-dimensional elements included in the automotive body model 31, and stacking the hexahedral three-dimensional elements along a plane including the nodal point disposed at the connection part.

For example, when the floor panel 33 of the automotive body model 31 is made of two-dimensional elements, the layered block model generation unit 15 may generate the layered block model 43 by setting nodal points of the two-dimensional elements of the floor panel 33 as connection parts with the layered block model 43 and stacking hexahedral three-dimensional elements along a surface including the nodal points of the floor panel 33.

(Connection Processing Unit)

The connection processing unit 17 performs processing of connecting the generated layered block model 43 to another part in the automotive body model 31. The connection of the layered block model 43 and the automotive body model 31 may be performed by using a rigid element, a two-dimensional element, and a beam element.

The connection of the layered block model 43 and the automotive body model 31 is preferably performed so that an original connection place of a part deleted as the design space 41 and the automotive body model 31 is reflected to accurately transfer a load from the automotive body model 31 to the layered block model 43.

(Optimization Analysis Unit)

The optimization analysis unit 19 provides analysis conditions to the automotive body model 31 to which the layered block model 43 is connected, and performs optimization analysis of determining an optimum shape of the layered block model 43. The analysis conditions include a load condition that provides a position at which a load is added and a restriction position, an objective condition and a constraint condition set in accordance with the object and constraint of the optimization analysis.

Figure 6:
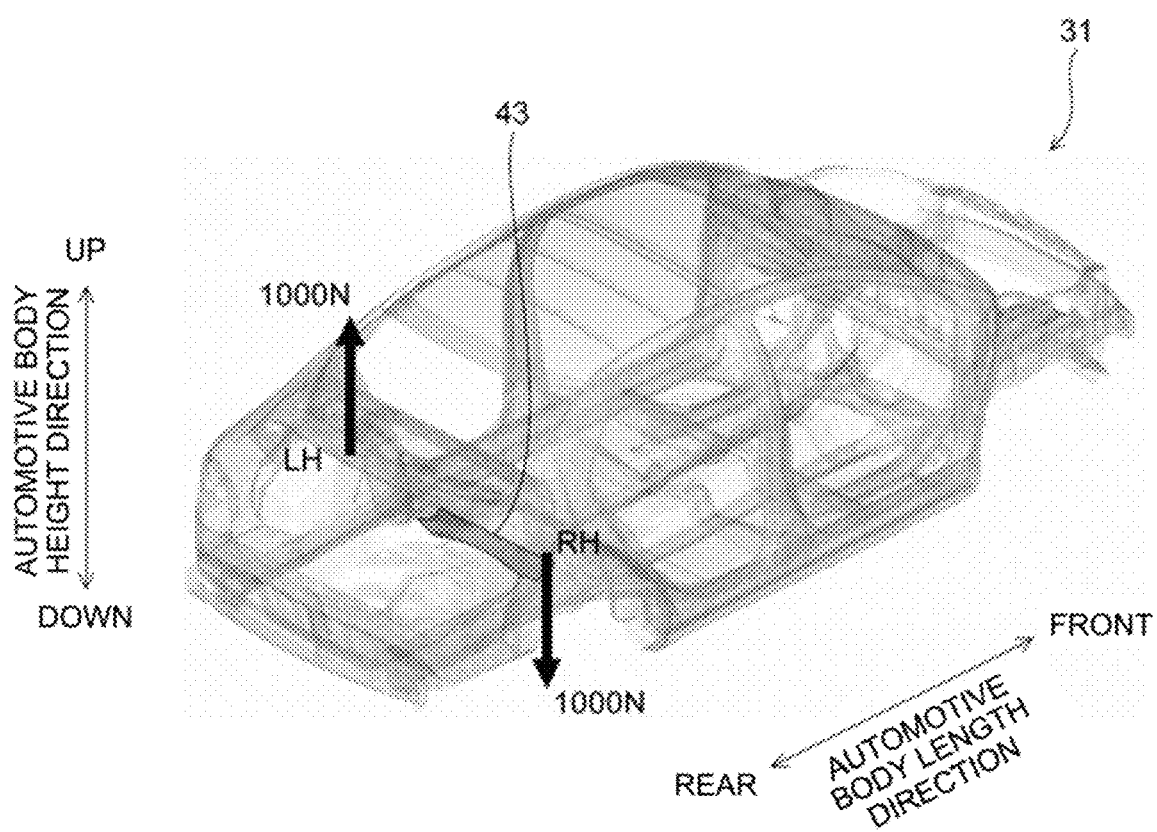
FIG. 6 is a diagram for description of a load condition input in optimization analysis processing in the embodiment (torsional stiffness).
Figure 7:
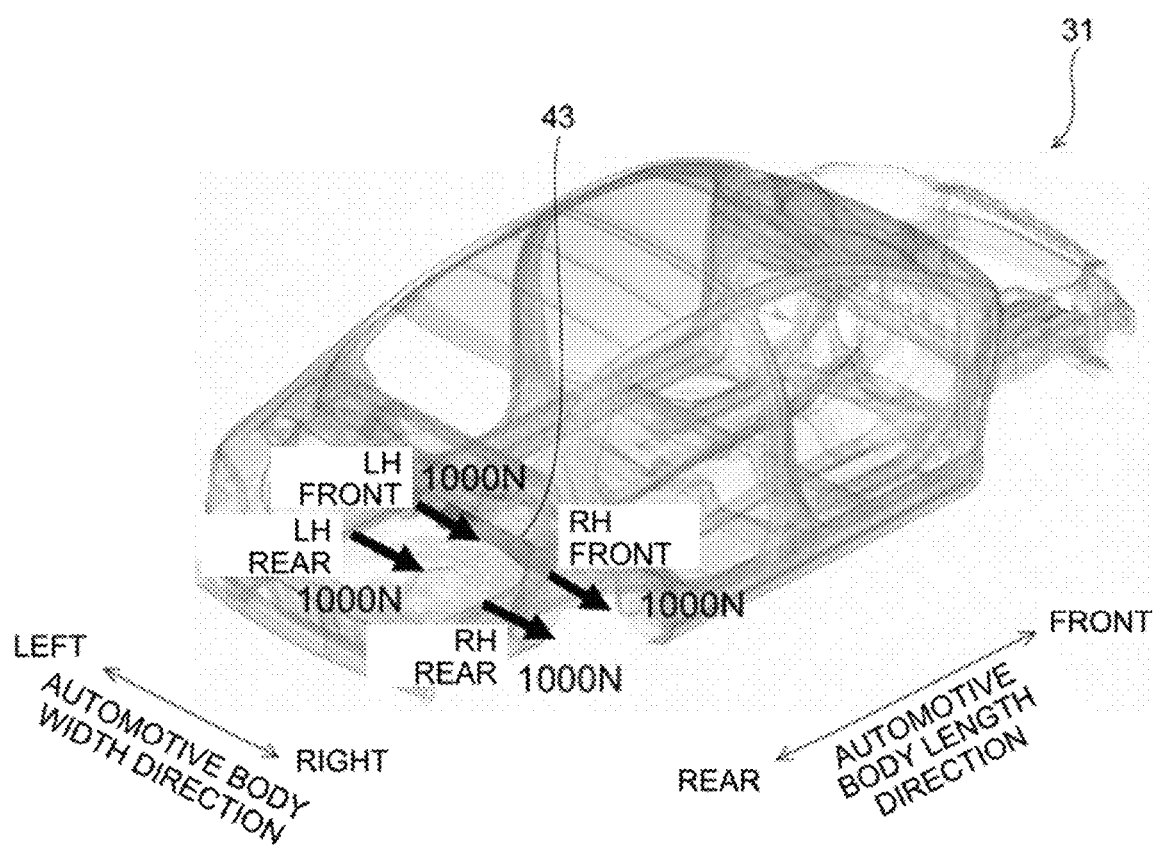
FIG. 7 is a diagram for description of a load condition input in the optimization analysis processing in the embodiment (lateral bending stiffness).

FIGS. 6 and 7 illustrate exemplary load conditions. FIG. 6 corresponds to a case in which the optimization analysis is performed on torsional stiffness, and FIG. 7 corresponds to a case in which the optimization analysis is performed on lateral bending stiffness.

When the optimization analysis is performed on the torsional stiffness, as illustrated in FIG. 6, load input points are set at two right and left suspension attachment parts on the rear side of the automotive body model 31, and loads (1000 N) are added upward and downward in the height direction of the automotive body at the respective load input points.

When the optimization analysis is performed on the lateral bending stiffness, as illustrated in FIG. 7, load input points are set at four suspension attachment parts on the rear side of the automotive body model 31, and predetermined loads (1000 N) are added rightward in the width direction of the automotive body at the respective load input points. In the load conditions illustrated in FIGS. 6 and 7, no restriction position is set, but in the present embodiment, the optimization analysis is performed by an inertia relief method based on an assumption that a state in which the automotive body model 31 is supported at a support point as a coordinate reference of inertial force acting on the automotive body model 31.

The load condition provided by the optimization analysis unit 19 is not limited to those described above, but the position of a load input on the automotive body model 31, a position at which displacement is restricted, and the like may be set as appropriate in accordance with the object of the optimization analysis.

Examples of the objective condition in the optimization analysis include minimization of the total strain energy, minimization of displacement, minimization of stress, and maximization of stiffness in the automotive body model 31. Examples of the constraint condition in the optimization analysis include constraints of volume fraction of the layered block model 43 as the target of the optimization analysis, and a plurality of constraint conditions may be set.

The constraints of volume fraction may be individually provided to the entire layered block model 43 or each layer (for example, each of the outer layer 43a and the inner layer 43b illustrated in FIGS. 4 and 5) of the layered block model 43.

For example, topology optimization may be applied to the optimization analysis processing performed by the optimization analysis unit 19. In the topology optimization, discretization is preferably performed by providing a penalty coefficient as an optimization parameter. The penalty coefficient in the discretization is preferably restricted to a value equal to or larger than 2 or a value three times to twenty times larger than the size of a three-dimensional element as a reference. When the discretization is performed by providing the penalty coefficient, the layered block model having a determined optimum shape can be reflected to a thin-sheet structural body shape.

The optimization analysis unit 19 may perform the topology optimization as described above or may perform optimization processing by another calculation method, and may use, for example, commercially available analysis software using a finite element method.

Figure 8:
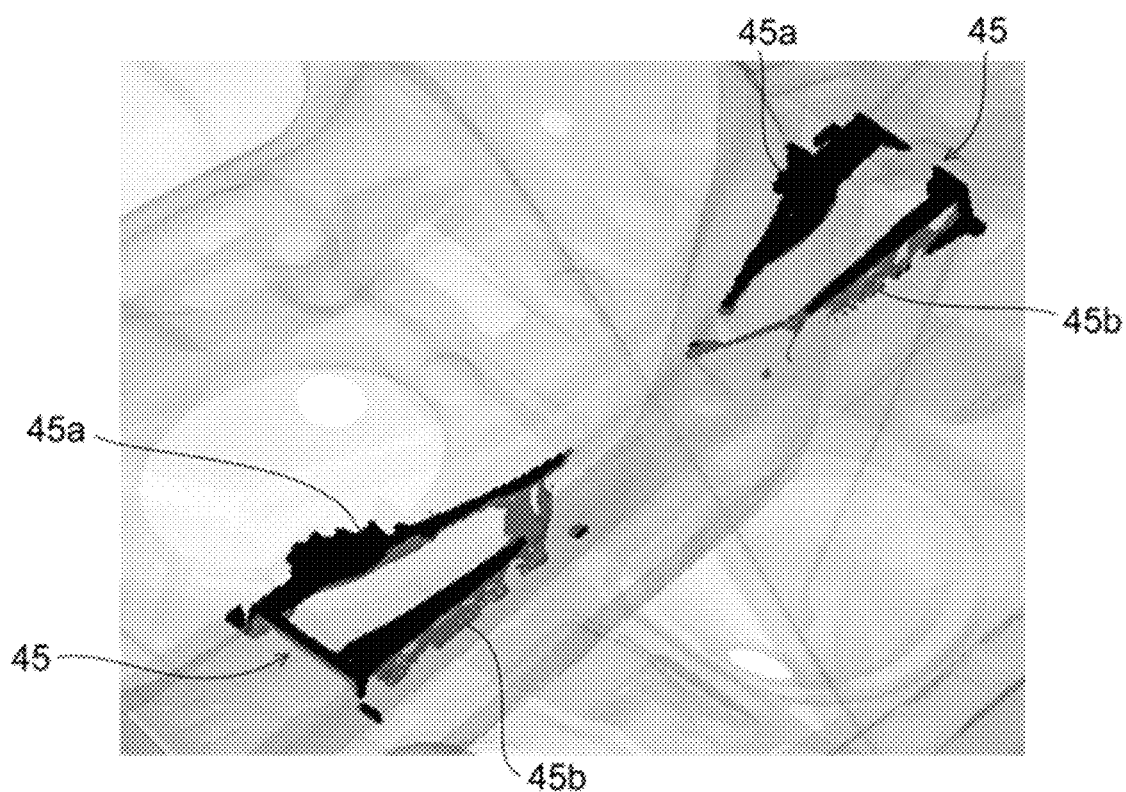
FIG. 8 is a diagram for description of an optimum shape obtained through the optimization analysis processing on a rear cross member in the embodiment.

FIG. 8 illustrates an exemplary optimum shape 45 obtained by setting the rear cross member as an optimization target and applying the topology optimization at the optimization analysis unit 19. The optimum shape 45 is obtained by leaving behind and deleting three-dimensional elements for each of the outer layer 43a and the inner layer 43b of the layered block model 43 so that the above-described analysis conditions (the load condition, the objective condition, and the constraint condition) are satisfied, and is made of an optimum-shape outer layer 45a and an optimum-shape inner layer 45b as illustrated in FIG. 8.

It should be noted that a load is transferred from the automotive body model 31 to the layered block model 43 through a part connected to the automotive body model 31. Specifically, when the load is transferred from the automotive body model 31 to the layered block model 43, the layered block model 43 deforms and the direction of the load and the like change in the optimization analysis processing performed by the optimization analysis unit 19, but the direction of the load and the like at each deformation is reflected so that the optimum shape 45 having an optimized shape is finally obtained.

In the above description, one design space 41 is set by the design space setting unit 13 and a plurality of layers are generated in the set design space 41 to generate the layered block model 43, but the generation of the layered block model 43 is not limited thereto.

In another aspect of the generation of the layered block model 43, the design space setting unit 13 may set, as a plurality of design spaces stacked in layers, the optimization target part of the automotive body model 31, and the layered block model generation unit 15 may provide material properties different from each other to the respective set design spaces to generate a plurality of laminated block models (corresponding to the outer layer 43a and the inner layer 43b illustrated in FIGS. 4 and 5) each including a three-dimensional element and may connect the laminated block models generated for the respective design spaces to generate a layered block model including the three-dimensional element.

In this case, the design space setting unit 13 can set a plurality of design spaces, for example, by deleting the optimization target part from part of the structural body model, setting one design space to the deleted part, and then dividing the design space into two or more design spaces stacked in lamination, or by newly setting, after setting one design space, another design space so that the other design space is stacked on the set design space in lamination.

Then, the layered block model generation unit 15 can generate layered block models stacked in lamination by connecting the laminated block models generated for the respective set design spaces and each including a three-dimensional element by sharing nodal points of the laminated block models or using a rigid element, a beam element, or a two-dimensional element.

<Layered-Composite-Member Shape Optimization Analysis Method>

The following describes the layered-composite-member shape optimization analysis method (hereinafter simply referred to as "shape optimization analysis method") according to the present embodiment.

Figure 9:
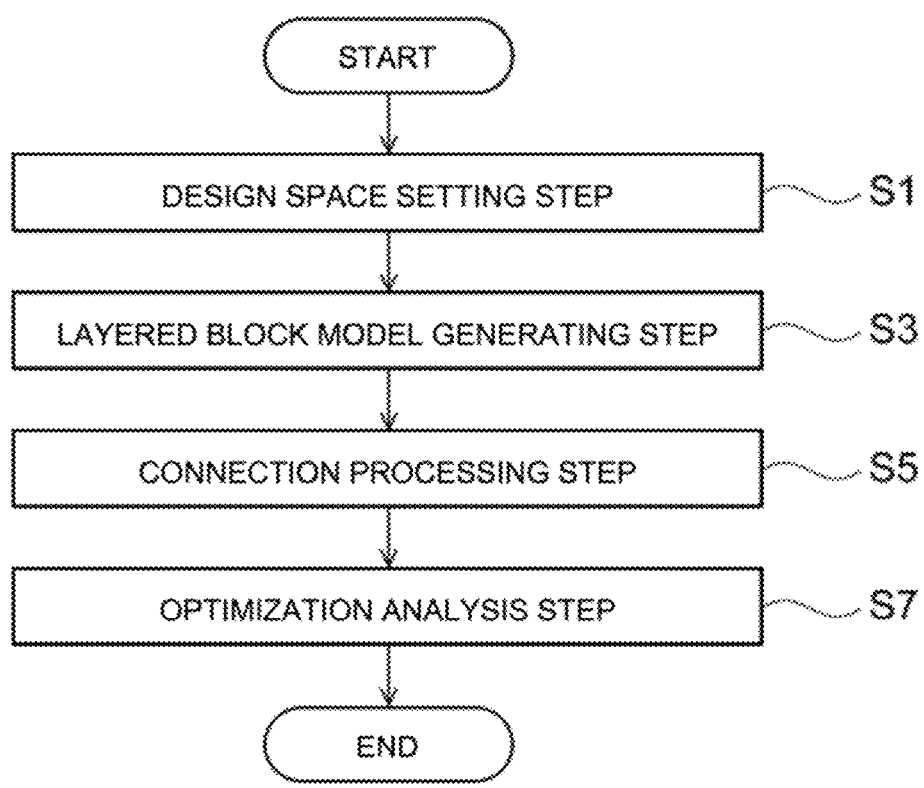
FIG. 9 is a flowchart illustrating the processing process of a layered-composite-member shape optimization analysis method according to the embodiment of the present invention.

The shape optimization analysis method according to the present embodiment produces, with the layered composite member, a model of part of the structural body model, and performs optimization analysis on the shape of the layered composite member of the produced model. As illustrated in FIG. 9, the shape optimization analysis method according to the present embodiment includes a design space setting step S1, a layered block model generating step S3, a connection processing step S5, and an optimization analysis step S7. The above-described steps are described below for a case in which the automotive body model 31 illustrated in FIG. 2 is an exemplary structural body model. The shape optimization analysis method according to the present embodiment can execute the above-described steps by using the shape optimization analysis device 1 (refer to FIG. 1) achieved by a computer.

<<Design Space Setting Step>>

The design space setting step S1 is a step of setting, as the design spaces 41 stacked in lamination, the optimization target part of the automotive body model 31 as illustrated in FIG. 2. In the shape optimization analysis device 1, the design space setting step S1 is performed by the design space setting unit 13.

<<Layered Block Model Generating Step>>

The layered block model generating step S3 is a step of generating, in the design space 41 set at the design space setting step S1, the layered block model 43 in which a plurality of layers each including a three-dimensional element and having material properties different from each other (for example, the outer layer 43a and the inner layer 43b illustrated in FIGS. 4 and 5) are layered. In the shape optimization analysis device 1, the layered block model generating step S3 is performed by the layered block model generation unit 15.

At the layered block model generating step S3, for example, the layered block model generation unit 15 generates a plurality of layers in which three-dimensional elements are stacked in lamination, and generates the layered block model 43 by coupling the layers by using a rigid element, a beam element, or a two-dimensional element or by coupling the layers by sharing nodal points of the three-dimensional elements of the layers. Each three-dimensional element used in the layered block model 43 is a polyhedron having surfaces in a number corresponding to one of a penta-hedron to an octa-hedron, and is preferably a three-dimensional element including at least one pair of two surfaces parallel to each other.

Then, in the layered block model 43, the layered block model generation unit 15 sets material properties (Young's modulus, Poisson's ratio, the specific gravity, and the like) for each layer. For example, when the material of any layer of the layered composite member has in-plane anisotropy as a material property like FRP, the angle of principal axis that provides in-plane anisotropy may be provided to the layer, and the value of the material property corresponding to the angle of principal axis may be set. In this case, the angle of principal axis may be set for each of the layers in the layered block model 43.

The layered block model generating step S3 preferably generates the layered block model 43 so that three-dimensional elements are segmentalized along surfaces surrounding the design space 41 set in the automotive body model 31 and in parallel to a surface of the design space 41 having the maximum area. The surfaces surrounding the set design space 41 are surfaces of a component at a part where the design space is to be set, and the surface of the design space having the maximum area is a surface having the maximum area among the surrounding surfaces.

<<Connection Processing Step>>

The connection processing step S5 is a step of connecting the layered block model 43 generated at the layered block model generating step S3 to the automotive body model 31. In the shape optimization analysis device 1, the connection processing step S5 is performed by the layered block model generation unit 15.

<<Optimization Analysis Step>>

The optimization analysis step S7 is a step of inputting an analysis condition to the automotive body model 31 to which the layered block model 43 is connected at the connection processing step S5 and performing the optimization analysis of determining the optimum shape 45 (FIG. 8) obtained by optimizing the shape of the layered block model 43. In the shape optimization analysis device 1, the optimization analysis step S7 is performed by the optimization analysis unit 19.

At the optimization analysis step S7, the optimization analysis unit 19 provides, as analysis conditions of the optimization analysis, a load condition that provides a position at which a load is added to the automotive body model 31, an objective condition set in accordance with the object of the optimization analysis, and a constraint condition applied when the optimization analysis is performed.

The topology optimization may be applied to the optimization analysis at the optimization analysis step S7. When a density method is applied in the topology optimization, discretization is preferably performed by setting the penalty coefficient for elements to be equal to or larger than 2.

The optimization analysis processing by another calculation scheme may be applied to the optimization analysis at the optimization analysis step S7, and for example, commercially available analysis software using finite elements may be used to perform the optimization analysis processing.

In the above description, the design space setting step S1 sets one design space 41, and the layered block model generating step S3 generates a plurality of layers in the set design space 41 to generate the layered block model 43 in which a plurality of layers having material properties different from each other are stacked, but the aspect of generation of the layered block model 43 is not limited thereto.

In another aspect of the generation of the layered block model 43, the design space setting step S1 may set, as a plurality of design spaces stacked in lamination, the optimization target part of the automotive body model 31, and the layered block model generating step S3 may provide material properties different from each other to the respective set design spaces to generate laminated block models (corresponding to, for example, the outer layer 43a and the inner layer 43b illustrated in FIGS. 4 and 5) each including a three-dimensional element, and may connect the laminated block models generated for the respective design spaces to generate the layered block model 43 including the three-dimensional element. In this case, the method of setting a plurality of design spaces at the design space setting step S1 may be same as that performed by the design space setting unit 13 described above.

As described above, with the layered-composite-member shape optimization analysis method and the layered-composite-member shape optimization analysis device according to the present embodiment, an optimum shape of a layered composite member can be accurately determined when part of a structural body as an automotive body is stiffened by using the layered composite member. In addition, weight reduction of the structural body can be achieved by using the layered composite member having an optimum shape. The effects of weight reduction and stiffness improvement of the structural body using the layered composite member having an optimum shape will be specifically described in examples to be described later.

In the above description, the structural body is the automotive body of an automobile, and the shape optimization analysis target is the rear cross member as a component of the automotive body, but the present invention is not limited to the rear cross member. The shape optimization analysis target may be a rear side member of an automobile or any other component as described later in the examples below, and the structural body and a component as analysis targets are not particularly limited.

EXAMPLES

The following describes an experiment performed to check the effects of aspects of the present invention. In the present example, a model of each of a rear cross member and a rear side member as components of the automotive body model 31 illustrated in FIG. 2 was produced with a layered composite member, and optimization analysis to determine an optimum shape thereof was performed.

In the optimization analysis of the layered composite member, first, the automotive body model 31 illustrated in FIG. 2 was acquired. The automotive body model 31 was a model of an automotive body produced by using a two-dimensional element and/or a three-dimensional element, and the material of the automotive body model 31 was steel.

Then, a design space was set at part of the acquired automotive body model 31, and a layered block model was generated in the set design space. In the present example, one design space was set, and a layered block model in which two layers having material properties different from each other are stacked was generated in the set design space.

FIG. 2 illustrates the design space 41 set in the automotive body model 31 for a rear cross member. As described above in the embodiment, the design space 41 is a space surrounded by a surface having a shape along the floor panel 33, a surface along the rear side member 35, and a surface determined based on the shape of the original rear cross member, the space being obtained by deleting a rear cross member (not illustrated) originally included in the automotive body model 31 while leaving behind the floor panel 33 and the rear side member 35 with which the rear cross member is joined.

Subsequently, the layered block model 43 in which the outer layer 43a and the inner layer 43b are stacked in lamination was generated in the set design space 41 (refer to FIGS. 3 to 5). The outer layer 43a and the inner layer 43b were each generated by stacking three layers of hexahedral three-dimensional elements, and the thicknesses of the outer layer 43a and the inner layer 43b were 5 mm. The outer layer 43a and the inner layer 43b were coupled with each other by sharing nodal points of the hexahedral three-dimensional elements included in the layers.

Then, material properties were set each of the outer layer 43a and the inner layer 43b of the layered block model 43. Table 1 lists materials used in the present example and the value of Young's modulus of each material.

TABLE 1

|  | GPa |
| --- | --- |
| Steel | 206 |
| Aluminum Alloy | 69 |
| CFRP | 500 (Isotropy) |
| GFRP | 20 (Isotropy) |
| Resin | 3 |

In Table 1, CFRP stands for carbon fiber reinforced plastics, GFRP stands for glass fiber reinforced plastics, and these materials each had an isotropic material property.

Then, the layered block model 43 to which the material properties were set was connected to the automotive body model 31, and the optimization analysis of determining an optimum shape of the layered block model 43 was performed. The layered block model 43 and the automotive body model 31 were connected with each other through the three-dimensional elements of the layered block model 43. To perform the optimization analysis, a load condition and an optimization analysis condition (an objective condition and a constraint condition) were provided as analysis conditions to the automotive body model 31 to which the layered block model 43 is connected.

In the present example, the load condition was such that loads of 1000 N were provided at the positions of arrows illustrated in FIGS. 6 and 7 at suspension attachment parts on the rear side and in the directions of the arrows for a case in which the optimization analysis is performed on the torsional stiffness illustrated in FIG. 6 and for a case in which the optimization analysis is performed on the lateral bending stiffness illustrated in FIG. 7.

In addition, the optimization analysis conditions were such that the minimum of the total strain energy was provided as the objective condition and the constraints of volume fraction of the layered block model 43 were provided as the constraint condition. As the constraints of volume fraction, the optimization analysis was performed for a case in which the constraints of volume fraction were 20% or lower for the entire layered block model 43.

In the present example, the topology optimization was used in the optimization analysis, the objective condition was minimization of the total strain energy, and the constraint condition was the constraints of volume fraction of the layered block model 43. The constraints of volume fraction were set for the entire layered block model 43.

In the present example, combination of material properties of the outer and inner layers of the layered block model was changed to perform the optimization analysis, and study was made on an optimum shape of the layered composite member due to the difference in combination of material properties.

FIGS. 10 to 16 illustrate analysis results of the optimum shape 45 obtained by setting the rear cross member as the optimization analysis target and performing the optimization analysis with different combinations of material properties of the layered block model 43.

FIGS. 10 to 16 correspond to results of the optimization analysis with different combinations of material properties (FIG. 4) (hereinafter, written in the format of "(outer layer material)-(inner layer material)") of the outer layer 43a and the inner layer 43b, and the combinations of material properties in FIGS. 10 to 16 are as follows: FIG. 10 corresponds to "steel-steel" (Case 1), FIG. 11 corresponds to "aluminum alloy-steel" (Case 2), FIG. 12 corresponds to "steel-aluminum alloy" (Case 3), FIG. 13 corresponds to "CFRP-steel" (Case 4), FIG. 14 corresponds to "steel-CFRP" (Case 5), FIG. 15 corresponds to "steel-GFRP" (Case 6), and FIG. 16 corresponds to "steel-resin" (Case 7).

Case 1, in which the materials of the outer layer 43a and the inner layer 43b are same (steel), is not included in the present invention, but Cases 2 to 7, in which the materials of the outer layer 43a and the inner layer 43b are set to be different from each other, are included in accordance with aspects of the present invention. The analysis results of FIGS. 10 to 16 were obtained with such a constraint condition in the optimization analysis that the constraints of volume fraction were 20% or lower for the entire layered block model 43. In each of FIGS. 10 to 16, (a) illustrates a remaining state including both the optimum-shape outer layer 45a and the optimum-shape inner layer 45b, (b) illustrates the optimum-shape outer layer 45a only, and (c) illustrates the optimum-shape inner layer 45b only.

In Case 1 in which the materials of the outer layer 43a and the inner layer 43b were same (steel), the optimum-shape outer layer 45a mainly remained and the optimum-shape inner layer 45b remained in a small amount as illustrated in FIG. 10. In Cases 3, 4, 6, and 7 in which the Young's modulus of the outer layer 43a was high, the optimum-shape outer layer 45a mainly remained as illustrated in FIGS. 12, 13, 15, and 16, which is a result similar to that of Case 1. This is because, in torsional and lateral bending modes, the stiffness at a part is higher when the material of the outer layer 43a having a Young's modulus higher than that of the inner layer 43b and positioned outside thereof remains in the automotive body model 31.

However, in Cases 2 and 5, in which the Young's modulus of the inner layer 43b was high, the optimum-shape inner layer 45b was likely to remain and the optimum shape 45 in which the materials of the optimum-shape outer layer 45a and the optimum-shape inner layer 45b both remained was obtained as illustrated in FIGS. 11 and 14.

Figure 17:
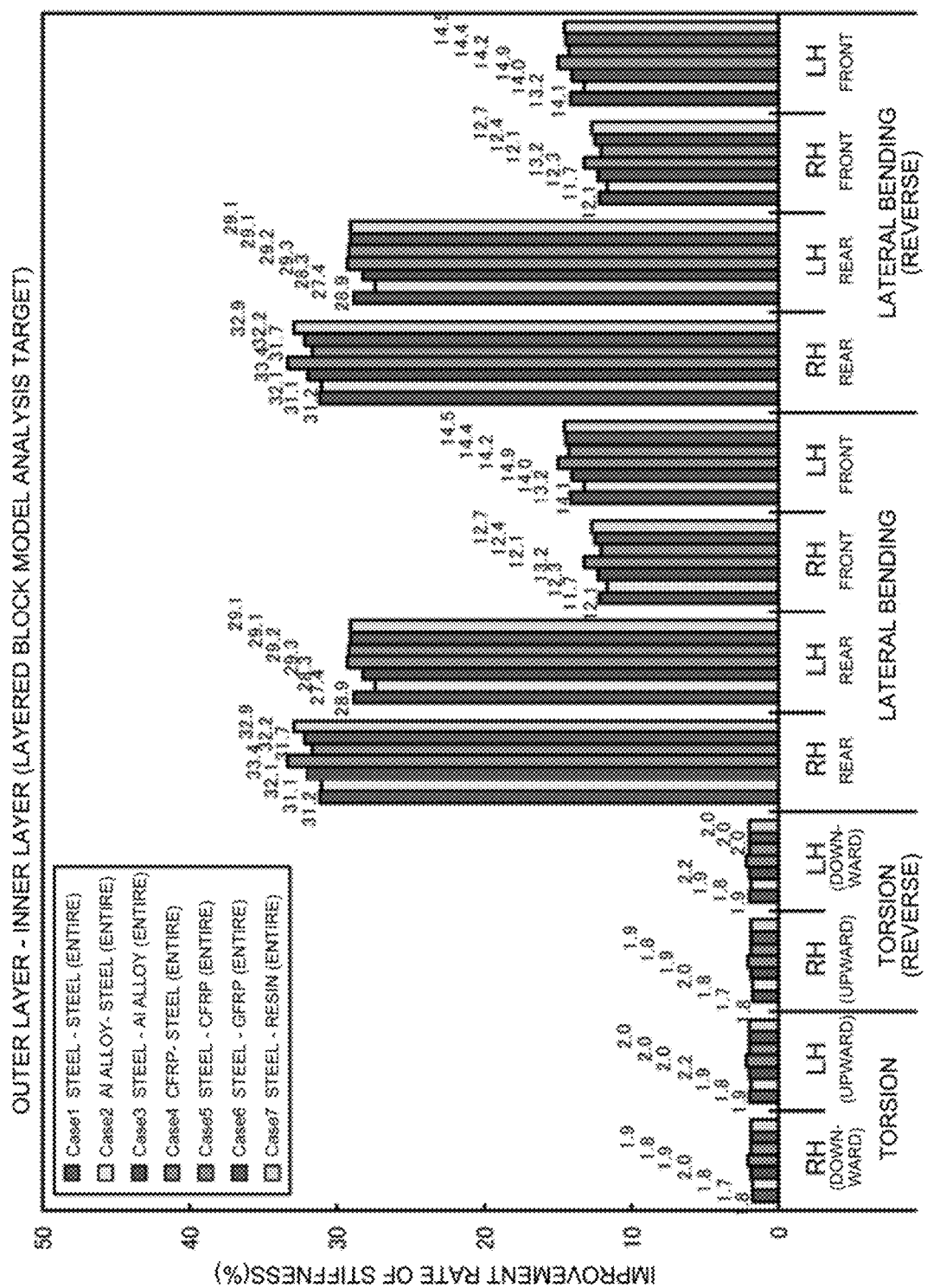
FIG. 17 is a graph illustrating influence of change in combination of material properties of a layered block model on the improvement rate of stiffness of the automotive body model to which the rear cross member in an optimum shape obtained through the optimization analysis is connected in the embodiment.
Figure 18:
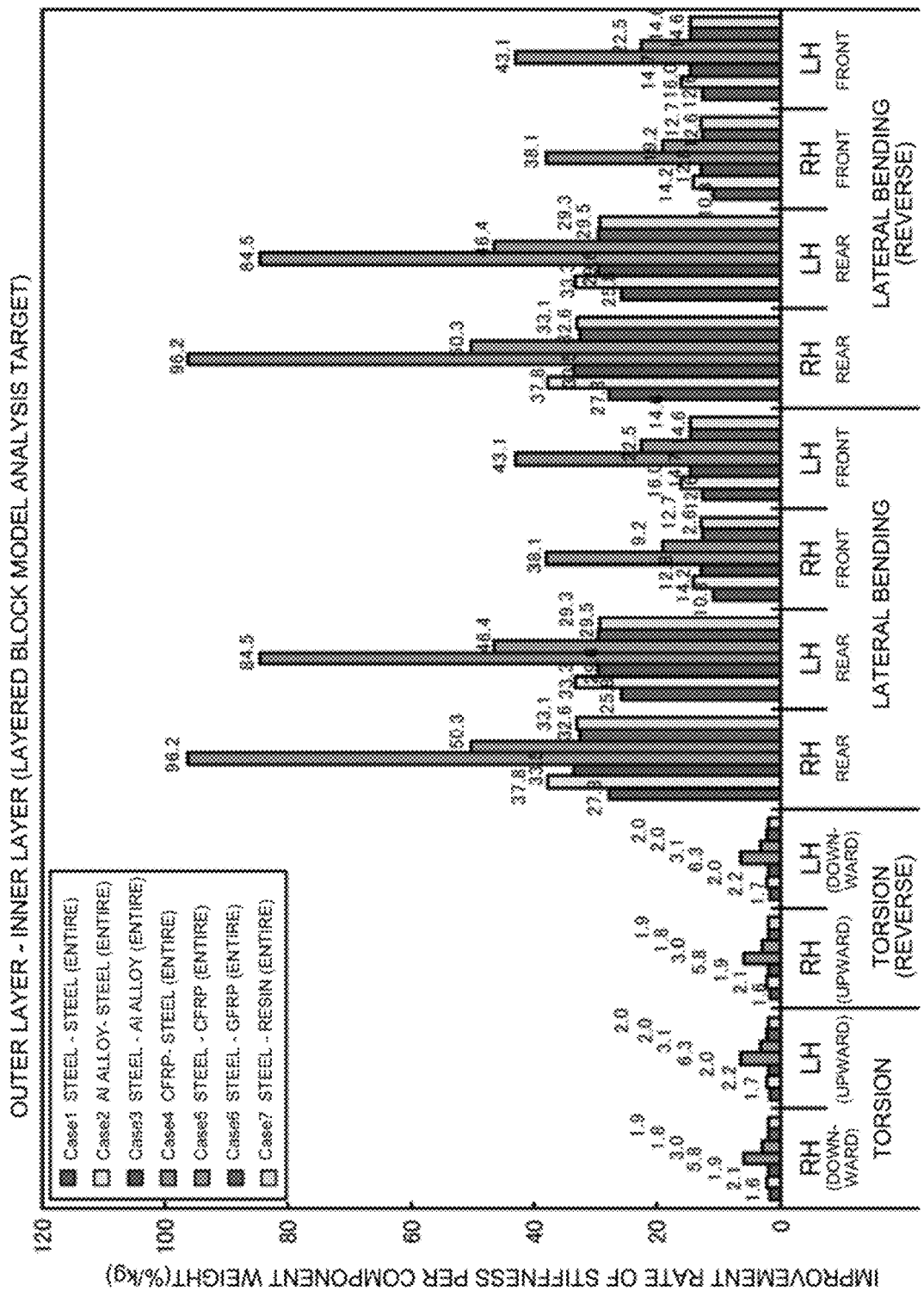
FIG. 18 is a graph illustrating influence of change in combination of material properties of the layered block model on the improvement rate of stiffness per component weight of the automotive body model to which the rear cross member in an optimum shape obtained through the optimization analysis is connected in the embodiment.

FIGS. 17 and 18 illustrate results of the improvement rate of stiffness of the automotive body model 31 to which the rear cross member made of the layered composite member having the optimum shape 45 obtained through the optimization analysis under conditions with different combinations of material properties of the layered block model 43 was connected.

In FIGS. 17 and 18, "torsion" and "lateral bending" on the horizontal axis correspond to respective cases in which the load conditions illustrated in FIGS. 6 and 7 were provided, and "RH" and "LH" represent load input positions (refer to FIGS. 6 and 7) under the load conditions. In addition, "reverse" in each of "torsion (reverse)" and "lateral bending (reverse)" on the horizontal axis indicates that a load input direction at each load input position was symmetric to that in the load condition for the corresponding one of "torsion" and "lateral bending".

In FIGS. 17 and 18, the "improvement rate of stiffness" on the vertical axis is a value with respect to stiffness in the automotive body model 31 from which the rear cross member as the optimization analysis target is removed, and the stiffness was calculated by dividing displacement at each load input point by an input load value. In addition, a value on the vertical axis in FIG. 18 is obtained by dividing the calculated improvement rate of stiffness by the weight of a component as the optimization target.

In FIGS. 17 and 18, bar graphs for the load conditions and the load input points on the horizontal axis are arranged in the order of conditions (Cases 1 to 7) indicated as legends in FIGS. 17 and 18 (the same applies to FIGS. 28 and 29 to be described later).

As understood from the results illustrated in FIG. 17, when the optimum shape 45 was connected to the automotive body model 31 from which the rear cross member is removed, the improvement rate of stiffness in Case 4, in which the material of the optimum-shape outer layer 45a was CFRP, was highest in the range of the present example.

This is synonymous with the fact that the stiffness of the structural body is higher when a component is arranged at the outermost periphery of the structural body, and is because higher performance (stiffness) is obtained when a material having a high Young's modulus is disposed at the outermost periphery. This also matches with the fact that, to arrange a material having a high Young's modulus at the outermost periphery, the shape of the material is enlarged, and as a result, the stiffness is increased. However, in Case 2, in which the material of the outer layer 43a was aluminum alloy, the improvement rate of stiffness was lowest in the range of the present example. This is thought to be because the material having a low Young's modulus was used as the outer layer corresponding to an outer peripheral part.

In evaluation of the improvement rate of stiffness per component weight illustrated in FIG. 18 in terms of weight efficiency, a result with high weight efficiency was obtained when the material of the optimum-shape outer layer 45a was CFRP, which has light weight and high stiffness. Specifically, it was indicated that, when the layered composite member is applied to the rear cross member of the automotive body and the weight of the layered composite member is reduced while the original stiffness of the automotive body is maintained, the weight reduction can be most achieved by using the layered composite member in which the material of the outer layer is CFRP.

In the present example, a model of the rear side member included in the automotive body model 31 was produced with the layered composite member, and optimization analysis to determine an optimum shape thereof was performed. When the optimization analysis was performed for the rear side member as well, first, a design space was set to the automotive body model 31. In a case of the rear side member, a rear bumper 39 with which a rear side member originally included in the automotive body model 31 was joined was deleted to obtain a design space surrounded by a surface having a shape along the floor panel 33, a surface along the shape of a side sill 37 connected with a front end part of the automotive body in the length direction, a surface along the shape of the rear bumper 39 connected with a rear end part of the automotive body in the length direction, and a surface determined the shape of the original rear side member based on.

Figure 19:
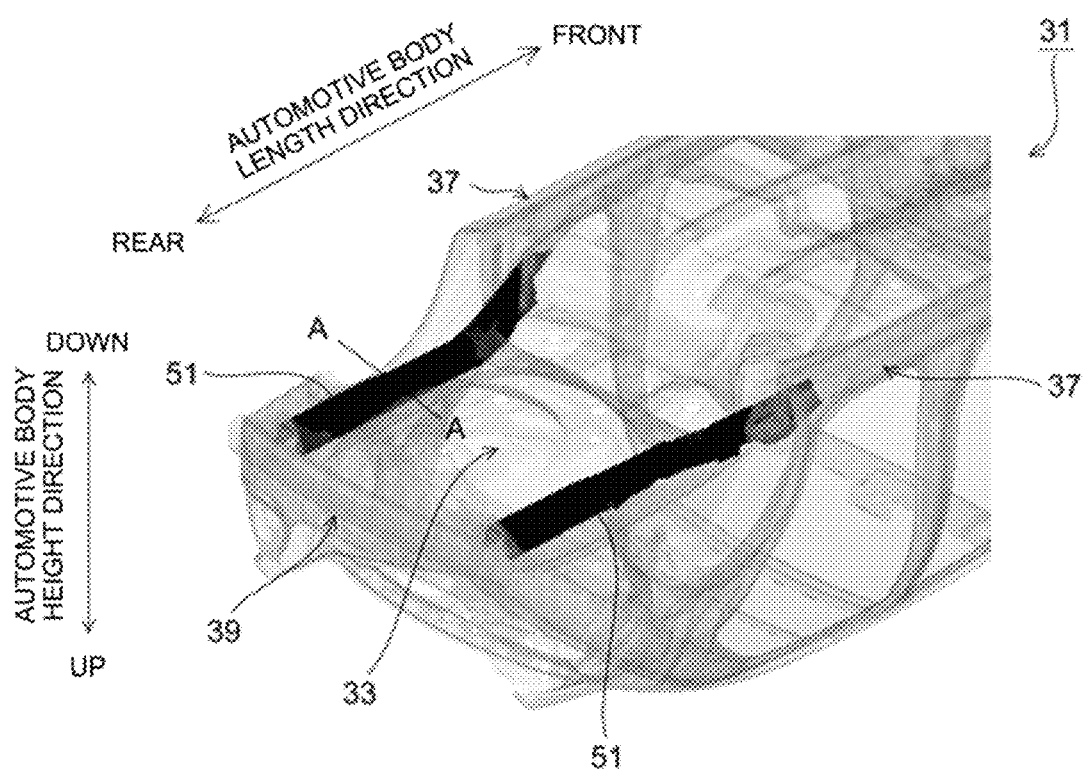
FIG. 19 is a diagram (1) illustrating a design space in which a rear side member of the automotive body model is set as a target in the embodiment.
Figure 21:
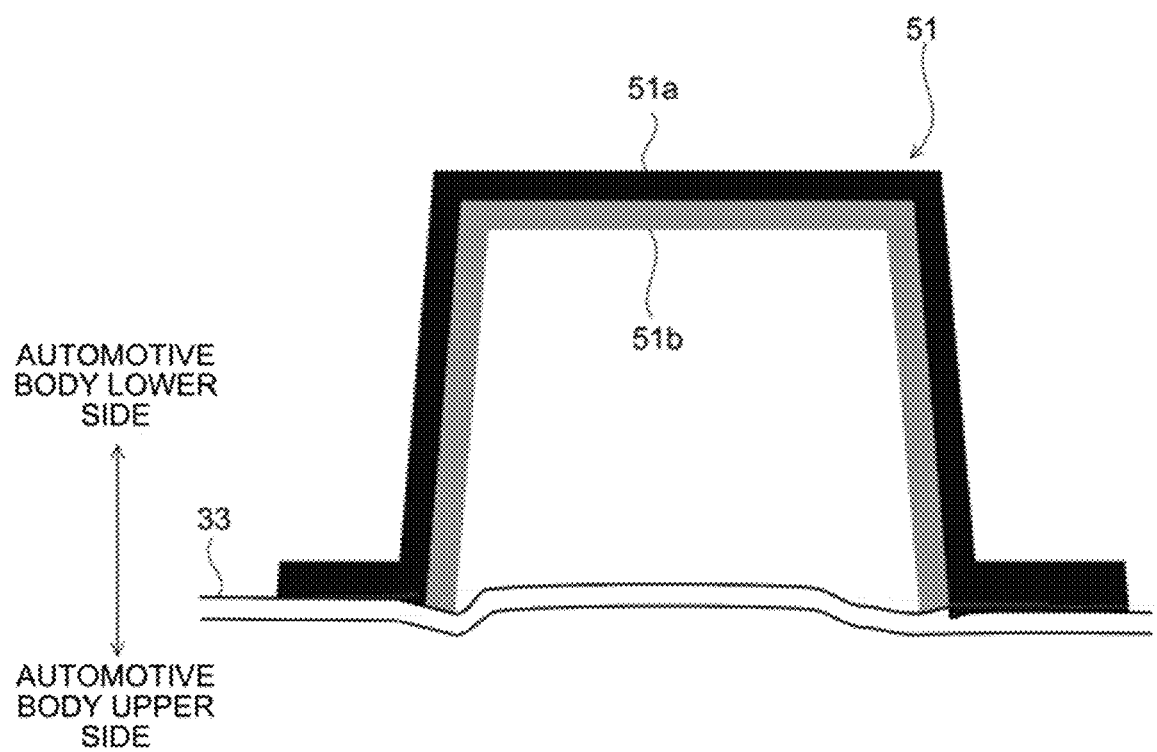
FIG. 21 is a cross-sectional view of the design space in which the rear side member of the automotive body model is set as a target in the embodiment.

Then, as illustrated in FIGS. 19 to 21, a layered block model 51 in which an outer layer 51a and an inner layer 51b are stacked in lamination was generated in the set design space. Similarly to the above-described layered block model 43 for the rear cross member, the outer layer 51a and the inner layer 51b of the layered block model 51 were each generated by stacking three layers of hexahedral three-dimensional elements, and the thicknesses of the outer layer 51a and the inner layer 51b were 5 mm. The outer layer 51a and the inner layer 51b were coupled with each other by sharing nodal points of the hexahedral three-dimensional elements included in the layers.

Material properties of the outer layer 51a and the inner layer 51b in the layered block model 51, connection of the layered block model 51 and the automotive body model 31, and analysis conditions (a load condition and an optimization analysis condition) in the optimization analysis of the layered block model 51 in the automotive body model 31 to which the layered block model 51 is connected are same as those in the above-described case for the rear cross member.

However, as for the constraint condition in the optimization analysis, the optimization analysis was performed for a case in which the constraints of volume fraction were 20% or lower for the entire layered block model 43 and for a case in which the constraints of volume fraction were 10% or lower for each of the outer layer 51a and the inner layer 51b of the layered block model 51.

FIGS. 22 to 27 illustrate analysis results of an optimum shape 53 obtained by setting the rear side member as the optimization analysis target and performing the optimization analysis with different combinations of material properties of the outer layer 51a and the inner layer 51b of the layered block model 51.

FIGS. 22 to 25 correspond to such a constraint condition in the optimization analysis that the constraints of volume fraction were 20% or lower for the entire layered block model 51 with different combinations of material properties (hereinafter, written in the format of "(outer layer material)-(inner layer material)") of the outer layer 51a and the inner layer 51b of the layered block model 51, and the combinations of material properties in FIGS. 22 to 25 are as follows: FIG. 22 corresponds to "steel-steel" (Case 1), FIG. 23 corresponds to "aluminum alloy-steel" (Case 2), FIG. 24 corresponds to "CFRP-steel" (Case 4), and FIG. 25 corresponds to "steel-CFRP" (Case 5).

FIGS. 26 and 27 correspond to such a constraint condition in the optimization analysis that the constraints of volume fraction of 10% or lower were provided to each of the outer layer 51a and the inner layer 51b of the layered block model 51 with the combination of material properties "(outer layer material)-(inner layer material)" of the outer layer 51a and the inner layer 51b being "steel-steel" (Case 1) for FIG. 26 and "CFRP-steel" (Case 4) for FIG. 27. In each of FIGS. 22 to 27, (a) illustrates a remaining state including both an optimum-shape outer layer 53a and an optimum-shape inner layer 53b, (b) illustrates the optimum-shape outer layer 53a only, and (c) illustrates the optimum-shape inner layer 53b only.

When the constraint condition with the constraints of volume fraction of 20% or lower were provided to the entire layered block model 51, similarly to the results (FIGS. 10 to 16) for the rear cross member, such a result was obtained that the optimum-shape outer layer 53a mainly remained in Cases 1 and 4 in which the material of the outer layer 51a had an equal or higher Young's modulus, and the material of the optimum-shape inner layer 53b was likely to remain in Cases 2 and 5 in which the material of the inner layer 51b had a high Young's modulus.

When the constraint condition with the constraints of volume fraction of 10% or lower were provided to each of the outer layer 51a and the inner layer 51b of the layered block model 51, such a result was obtained that the material of the optimum-shape inner layer 53b was increased because the constraints of volume fraction as the constraint condition were satisfied irrespective of the Young's modulus of the outer layer 51a.

Figure 28:
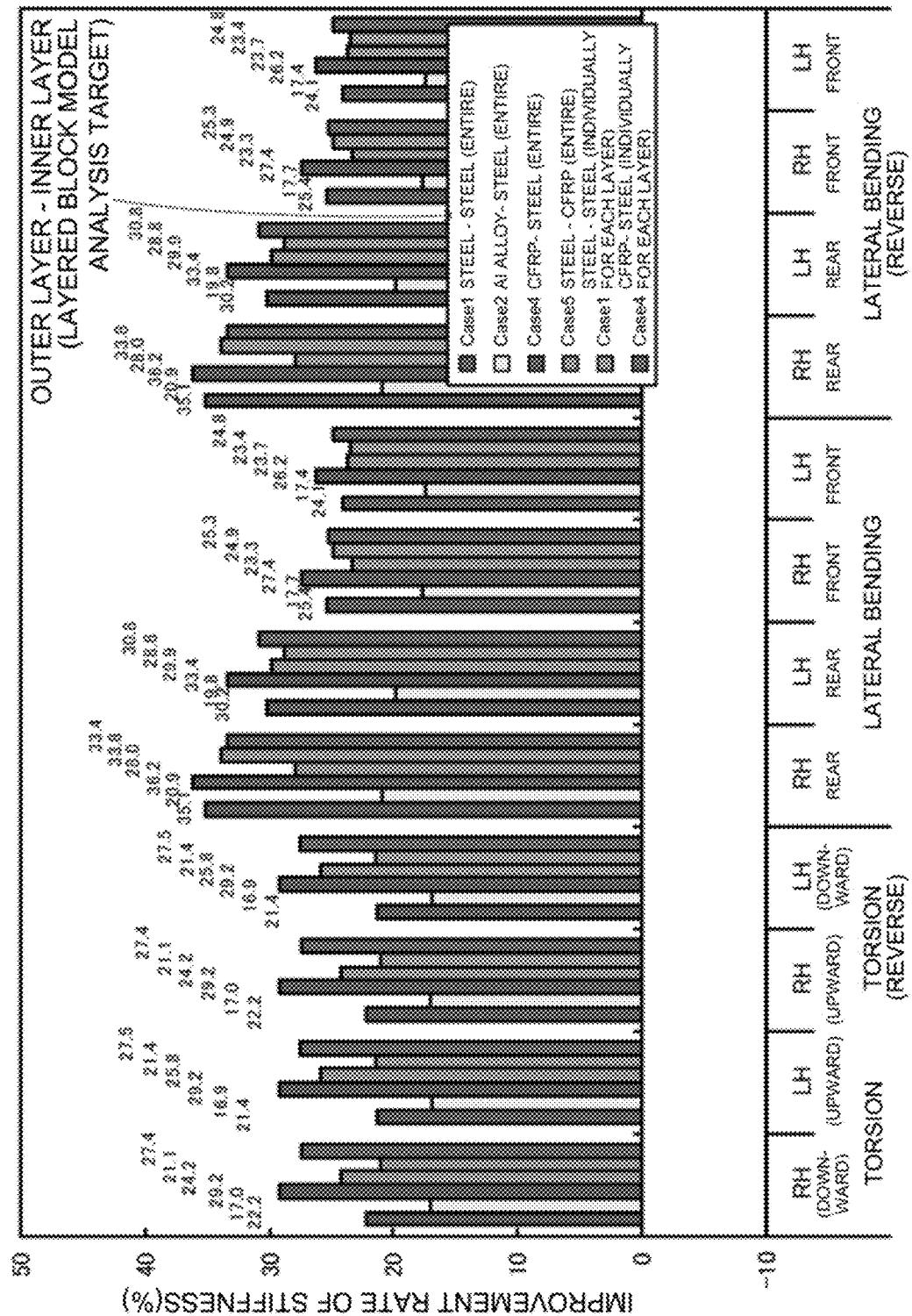
FIG. 28 is a graph illustrating influence of change in combination of material properties of the layered block model for the rear side member on the improvement rate of stiffness of the automotive body model to which the rear side member in an optimum shape obtained through the optimization analysis is connected in the embodiment.
Figure 29:
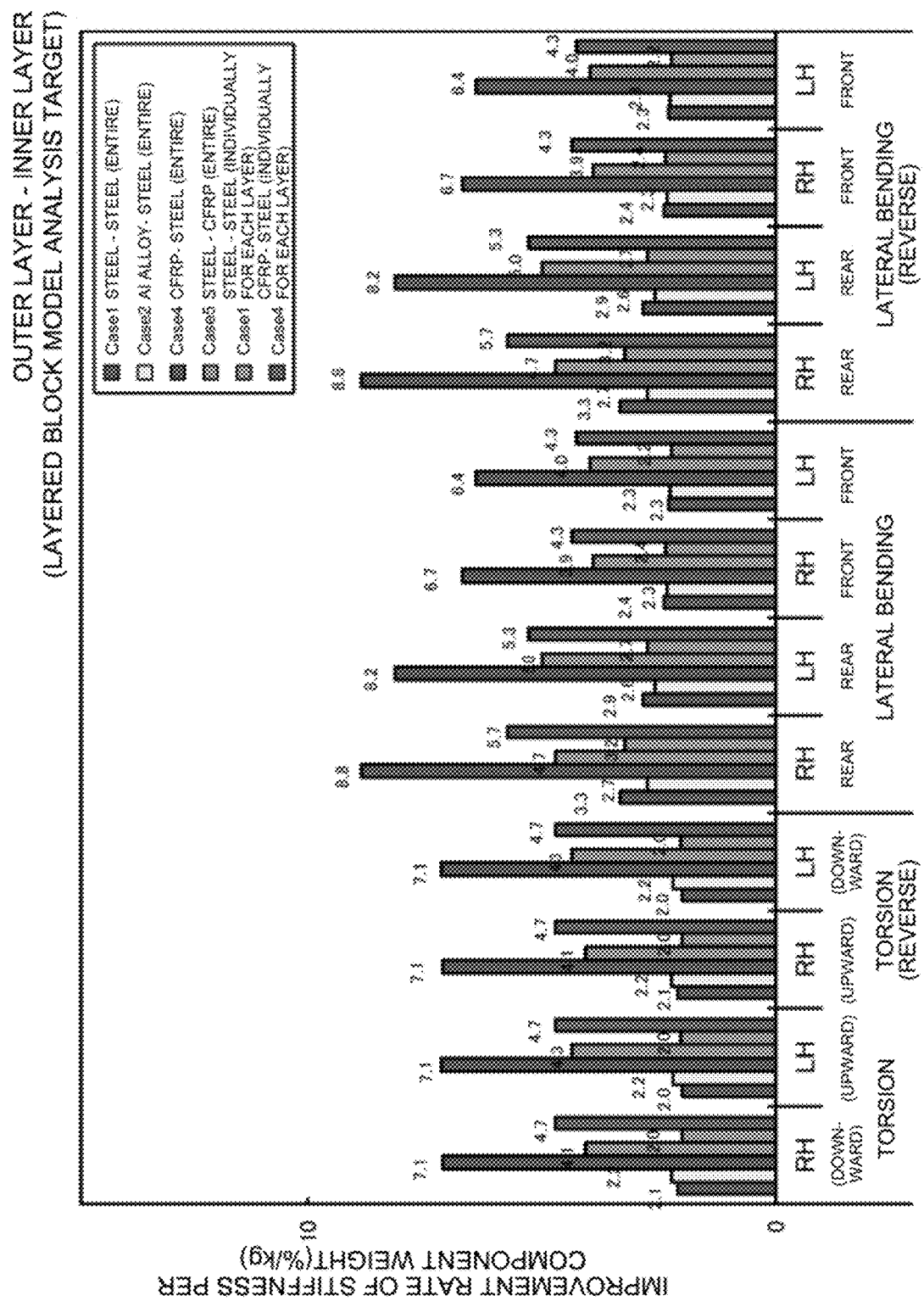
FIG. 29 is a graph illustrating influence of change in combination of material properties of the layered block model for the rear side member on the improvement rate of stiffness per part weight of the automotive body model to which the rear side member in an optimum shape obtained through the optimization analysis is connected in the embodiment.

FIGS. 28 and 29 illustrate the improvement rate of stiffness of the automotive body model 31 to which the rear side member made of the layered composite member of the optimum shape 53 obtained through the optimization analysis under conditions with different combinations of material properties of the layered block model 51 and different constraint conditions is connected.

In FIGS. 28 and 29, "torsion", "lateral bending", "RH", and "LH" on the horizontal axis, and the "improvement rate of stiffness" and the "improvement rate of stiffness per component weight" on the vertical axis are same as those in FIGS. 17 and 18. The "improvement rate of stiffness" is a value with respect to the stiffness of the automotive body model 31 before the rear side member (steel plate thickness 1.8 mm) as the optimization analysis target is removed. Among legends in FIGS. 28 and 29, "entire" corresponds to the constraint condition that the constraints of volume fraction were set to the entire layered block model 51, and "individually for each layer" correspond to the constraint condition that the constraints of volume fraction were set to each of the outer layer 51a and the inner layer 51b of the layered block model 51.

As understood from the results illustrated in FIG. 28, when the optimum shape 53 obtained by the optimization analysis was connected to the automotive body model 31 in place of the rear side member, the improvement rate of stiffness was high in Case 4 in which the material of the optimum-shape outer layer 53a was CFRP. This is synonymous with the fact that the stiffness is higher for arrangement at the outermost periphery, and is because higher performance is obtained when a material having a high Young's modulus is disposed at the outermost periphery. This also matches with the fact that, to arrange a material having a high Young's modulus at the outermost periphery, the shape of the material is enlarged, and as a result, the stiffness is increased. However, in Case 2, in which the material of the optimum-shape outer layer 53a was aluminum alloy, the improvement rate of stiffness was lowest in the range of the present example. This is thought to be because the Young's modulus of the aluminum alloy is low.

In comparison of Case 1 (outer layer: steel, inner layer: steel) and Case 4 (outer layer: CFRP, inner layer: steel), the improvement rate of stiffness when the torsion load was applied differs between the cases, but the improvement rate of stiffness when the lateral bending load was applied had values relatively close to each other for the cases. Significant difference in the improvement rate of stiffness is thought to be more likely to occur to the torsion load because, in the automotive body model 31, the torsion load contributes to the entire circumference (entire surface) centered at the centroid of the automotive body model 31 but the lateral bending load contributes only to the centroid and upper and lower surfaces centered at the centroid.

In terms of the constraints of volume as the constraint condition, the improvement rate of stiffness was higher for the case in which the constraints of volume fraction were applied to the entire layered block model than for the case the constraints of volume fraction were individually applied to each of the outer layer and the inner layer. This is thought to be because more efficient material arrangement can be selected, for example, a larger amount of material can remain at the outer layer when the constraints of volume fraction are provided to the entire layered block model.

In evaluation of the improvement rate of stiffness per component weight illustrated in FIG. 29 in terms of weight efficiency, similarly to the above-described results (FIG. 18) of the rear cross member, a result with highest weight efficiency was obtained when the material of the optimum-shape outer layer 53a was CFRP, which has light weight and high stiffness. Specifically, similarly to the above-described case of the rear cross member, it was indicated that, when the layered composite member is applied to the rear side member of the automotive body, weight reduction can be most achieved by using the layered composite member in which the material of the outer layer is CFRP.

With the layered-composite-member shape optimization analysis method and the layered-composite-member shape optimization analysis device according to aspects of the present invention, an optimum shape of a layered composite member can be obtained when part of an automotive body is stiffened by using the layered composite member.

INDUSTRIAL APPLICABILITY

Aspects of the present invention provide a layered-composite-member shape optimization analysis method and a layered-composite-member shape optimization analysis device that determine an optimum shape of a layered composite member when the stiffness of part of a structural body as an automotive body is improved by using the layered composite member.

REFERENCE SIGNS LIST 1 shape optimization analysis device
3 display device
5 input device
7 memory storage
9 working data memory
11 arithmetic processing unit
13 design space setting unit
15 layered block model generation unit
17 connection processing unit
19 optimization analysis unit
21 structural body model file
31 automotive body model
33 floor panel
35 rear side member
37 side sill
39 rear bumper
41 design space of rear cross member
43 layered block model
43a outer layer
43b inner layer
45 optimum shape
45a optimum-shape outer layer
45b optimum-shape inner layer
51 layered block model
51a outer layer
51b inner layer
53 optimum shape
53a optimum-shape outer layer
53b optimum-shape inner layer

The invention claimed is:

1. A layered-composite-member shape optimization analysis method of obtaining, with a layered composite member, a model of part of a structural body model of an automotive body including a two-dimensional element or a two-dimensional element and a three-dimensional element, and performing optimization analysis on the shape of the layered composite member of the obtained model, the method executed by a computer, and comprising:
   a design space setting step of setting, as a design space, an optimization target part of the structural body model of the automotive body;
   a layered block model generating step of generating a layered block model in the set design space, the layered block model including layers, each layer being a three-dimensional element and having material properties different from each other,
   wherein the layered block model is obtained by: coupling the layers by using a rigid element, a beam element, or a two-dimensional element; or coupling the layers by sharing nodal points of the layers,
   wherein a material having a high Young's modulus is disposed at an outermost periphery of the layered block model;
   a connection processing step of connecting the generated layered block model to the part of the structural body model of the automotive body; and
   an optimization analysis step of:
      inputting an analysis condition,
      performing optimization analysis on the layered block model as an optimization analysis target by:
         providing a minimum total strain energy as an objective condition, and
         providing volume fraction constraints to the layered block model as a constraint condition, and
      determining an optimum shape of the layered block model.

2. A layered-composite-member shape optimization analysis method of obtaining, with a layered composite member, a model of part of a structural body model of an automotive body including a two-dimensional element or a two-dimensional element and a three-dimensional element, and performing optimization analysis on the shape of the layered composite member of the obtained model, the method executed by a computer, and comprising:
   a design space setting step of setting, as a plurality of design spaces stacked in lamination, an optimization target part of the structural body model of the automotive body;
   a layered block model generating step of providing material properties different from each other to the respective set design spaces to generate laminated block models each including a three-dimensional element, and connecting the laminated block models generated for the respective design spaces to generate a layered block model including the three-dimensional element,
   wherein the layered block model is obtained by: coupling layers, each layer being a three-dimensional element and having material properties different from each other, by using a rigid element, a beam element, or a two-dimensional element; or coupling the layers by sharing nodal points of the layers,
   wherein a material having a high Young's modulus is disposed at an outermost periphery of the layered block model;
   a connection processing step of connecting the generated layered block model to the structural body model of the automotive body; and
   an optimization analysis step of:
      inputting an analysis condition,
      performing optimization analysis on the layered block model as an optimization analysis target by:
         providing a minimum total strain energy as an objective condition, and providing volume fraction constraints to the layered block model as a constraint condition, and determining an optimum shape of the layered block model.

3. The layered-composite-member shape optimization analysis method according to claim 2, wherein the layered block model includes a three-dimensional element that is one of a penta-hedron to an octa-hedron having at least one pair of two surfaces parallel to each other.

4. The layered-composite-member shape optimization analysis method according to claim 2, wherein the layered block model is generated so that a surface parallel to surfaces surrounding the design space set at the part of the structural body model of the automotive body has maximum area.

5. The layered-composite-member shape optimization analysis method according to claim 2, wherein the layered block model is generated by disposing nodal points at connection parts with the two-dimensional elements or three-dimensional elements of the part of the structural body model of the automotive body, using hexahedral three-dimensional elements as the three-dimensional elements of the layered block model, and stacking three-dimensional elements along a plane including the nodal points disposed at the connection parts.

6. The layered-composite-member shape optimization analysis method according to claim 2, wherein the optimization analysis step performs discretization with an optimization parameter in optimization analysis.

7. The layered-composite-member shape optimization analysis method according to claim 2, wherein the optimization analysis step performs optimization analysis by topology optimization.

8. A layered-composite-member shape optimization analysis device configured to obtain, with a layered composite member, a model of part of a structural body model of an automotive body including a two-dimensional element or a two-dimensional element and a three-dimensional element, and perform optimization analysis on the shape of the layered composite member of the obtained model, the device comprising a processor configured to execute a computer program including instructions that, when executed, are configured to:

set, as a design space, an optimization target part of the structural body model of the automotive body;

generate a layered block model in the set design space, the layered block model including layers, each layer being a three-dimensional element and having material properties different from each other, wherein the layered block model is obtained by: coupling the layers by using a rigid element, a beam element, or a two-dimensional element; or coupling the layers by sharing nodal points of the layers, wherein a material having a high Young's modulus is disposed at an outermost periphery of the layered block model;

connect the generated layered block model to the part of the structural body model of the automotive body; and receive an analysis condition;

perform optimization analysis on the layered block model as an optimization analysis target by:

providing a minimum total strain energy as an objective condition, and providing volume fraction constraints to the layered block model as a constraint condition; and determine an optimum shape of the layered block model.

9. A layered-composite-member shape optimization analysis device configured to obtain, with a layered composite member, a model of part of a structural body model of an automotive body including a two-dimensional element or a two-dimensional element and a three-dimensional element, and perform optimization analysis on the shape of the layered composite member of the obtained model, the device comprising a processor configured to execute a computer program including instructions that, when executed, are configured to:

set, as a plurality of design spaces stacked in lamination, an optimization target part of the structural body model of the automotive body;

provide material properties different from each other to the respective set design spaces to generate laminated block models each including a three-dimensional element, and configured to connect the laminated block models generated for the respective design spaces to generate a layered block model including the three-dimensional element, wherein the layered block model is obtained by: coupling layers, each layer being a three-dimensional element and having material properties different from each other, by using a rigid element, a beam element, or a two-dimensional element; or coupling the layers by sharing nodal points of the layers, wherein a material having a high Young's modulus is disposed at an outermost periphery of the layered block model;

connect the generated layered block model to the part of the structural body model of the automotive body; and receive an analysis condition;

perform optimization analysis on the layered block model as an optimization analysis target by:

providing a minimum total strain energy as an objective condition, and providing volume fraction constraints to the layered block model as a constraint condition; and determine an optimum shape of the layered block model.

10. The layered-composite-member shape optimization analysis device according to claim 9, wherein the layered block model includes a three-dimensional element that is one of a penta-hedron to an octa-hedron having at least one pair of two surfaces parallel to each other.

11. The layered-composite-member shape optimization analysis device according to claim 9, wherein the layered block model is generated so that a surface parallel to surfaces surrounding the design space set at the part of the structural body model of the automotive body has maximum area.

12. The layered-composite-member shape optimization analysis device according to claim 9, wherein the layered block model is generated by disposing nodal points at connection parts with the two-dimensional elements or three-dimensional elements of the part of the structural body model of the automotive body, using hexahedral three-dimensional elements as the three-dimensional elements of the layered block model, and stacking three-dimensional elements along a plane including the nodal points disposed at the connection parts.

13. The layered-composite-member shape optimization analysis device according to claim 9, wherein the optimization analysis unit performs discretization with an optimization parameter in optimization analysis.

14. The layered-composite-member shape optimization analysis device according to claim 9, wherein the optimization analysis unit performs optimization analysis by topology optimization.

* * * * *